July 23, 1957 N. E. SHOCKEY ET AL 2,800,151
MECHANISM FOR MAKING WIRE REINFORCED FABRIC
SPRING LINERS OR THE LIKE
Original Filed May 17, 1950 13 Sheets-Sheet 6
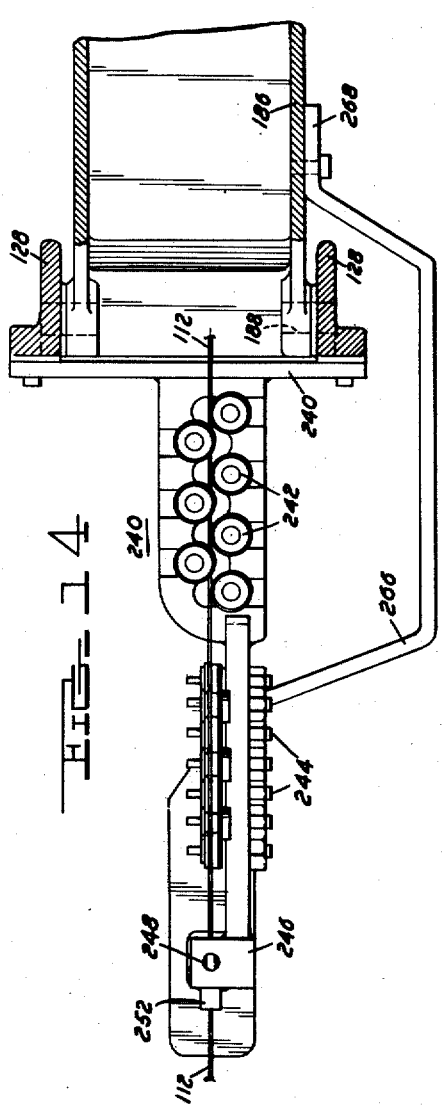
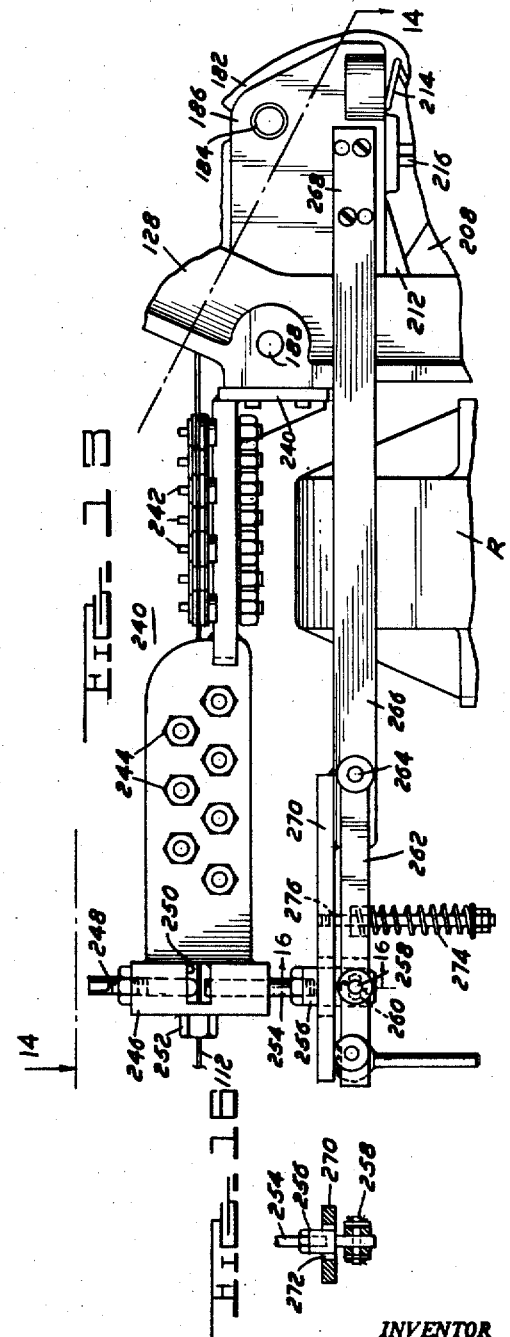
INVENTOR
NEWTON E. SHOCKEY
HOWARD WENDALL WILKINS
BY
Burton E. Parker
ATTORNEYS

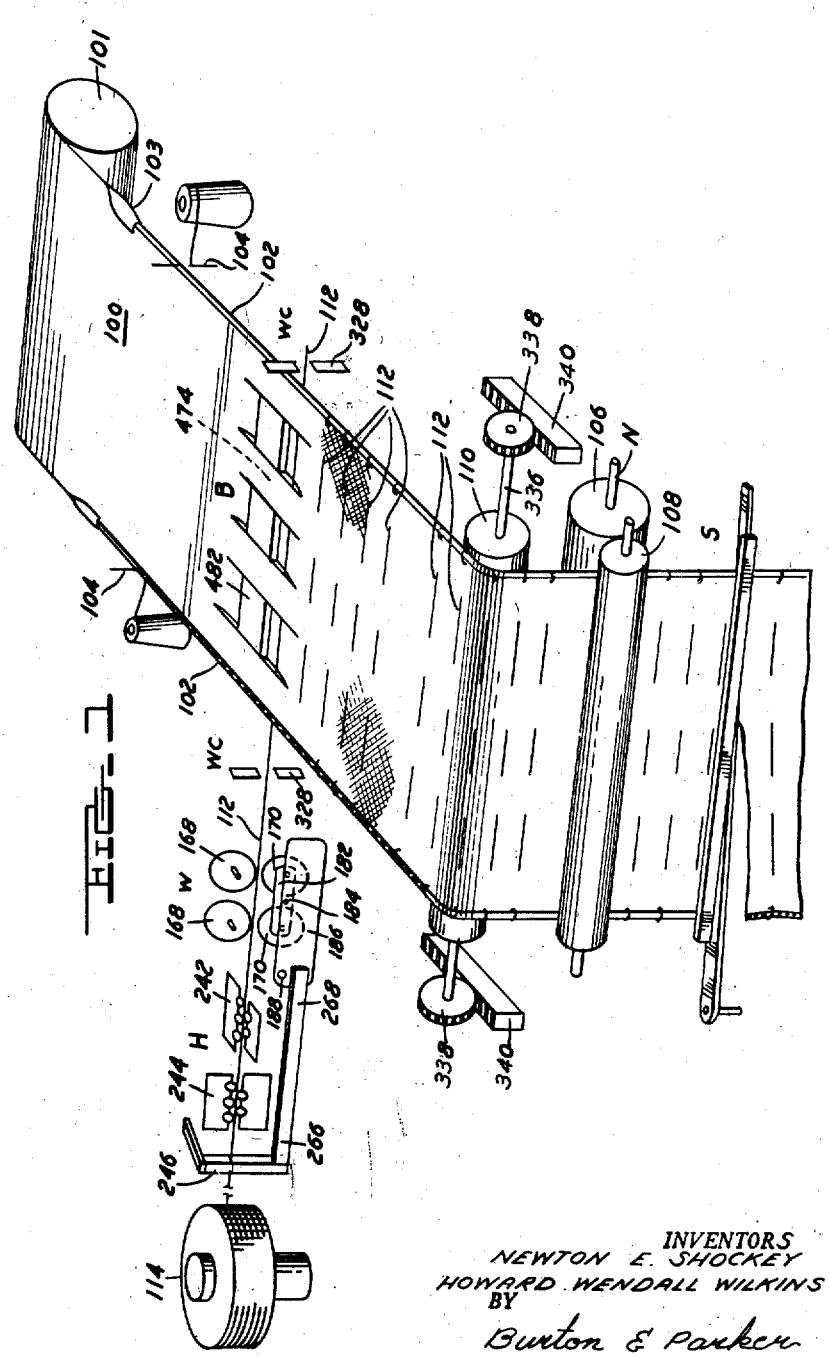

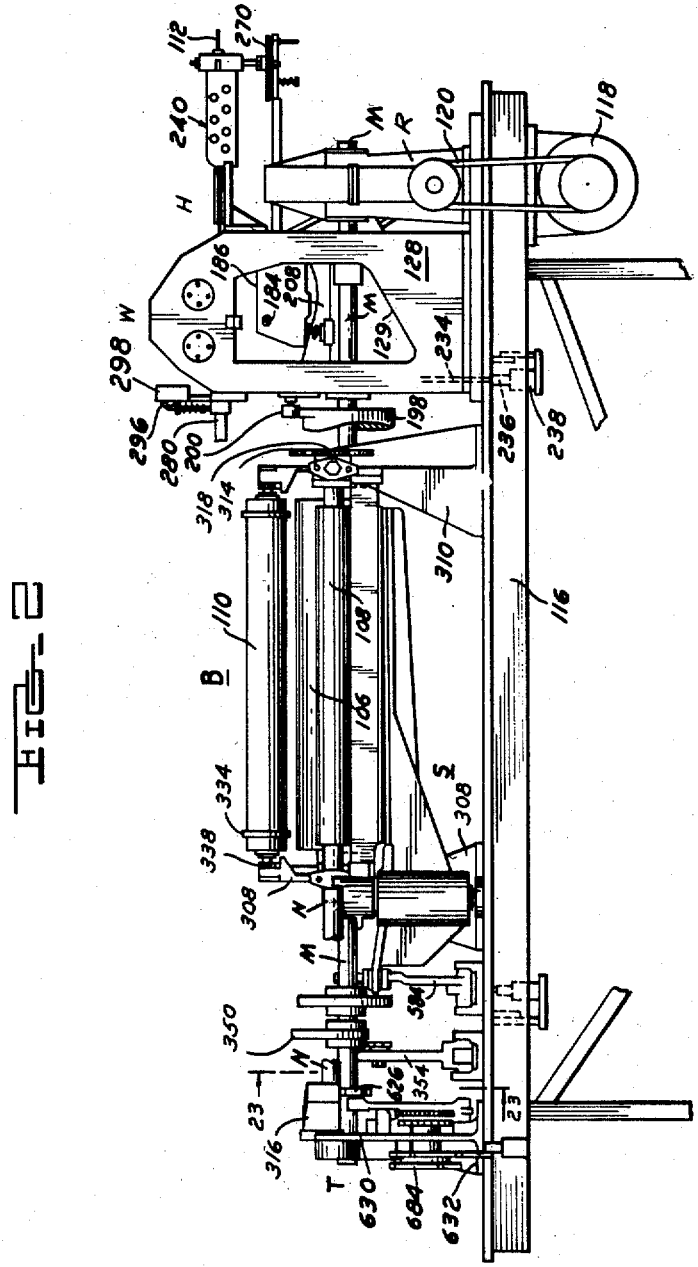

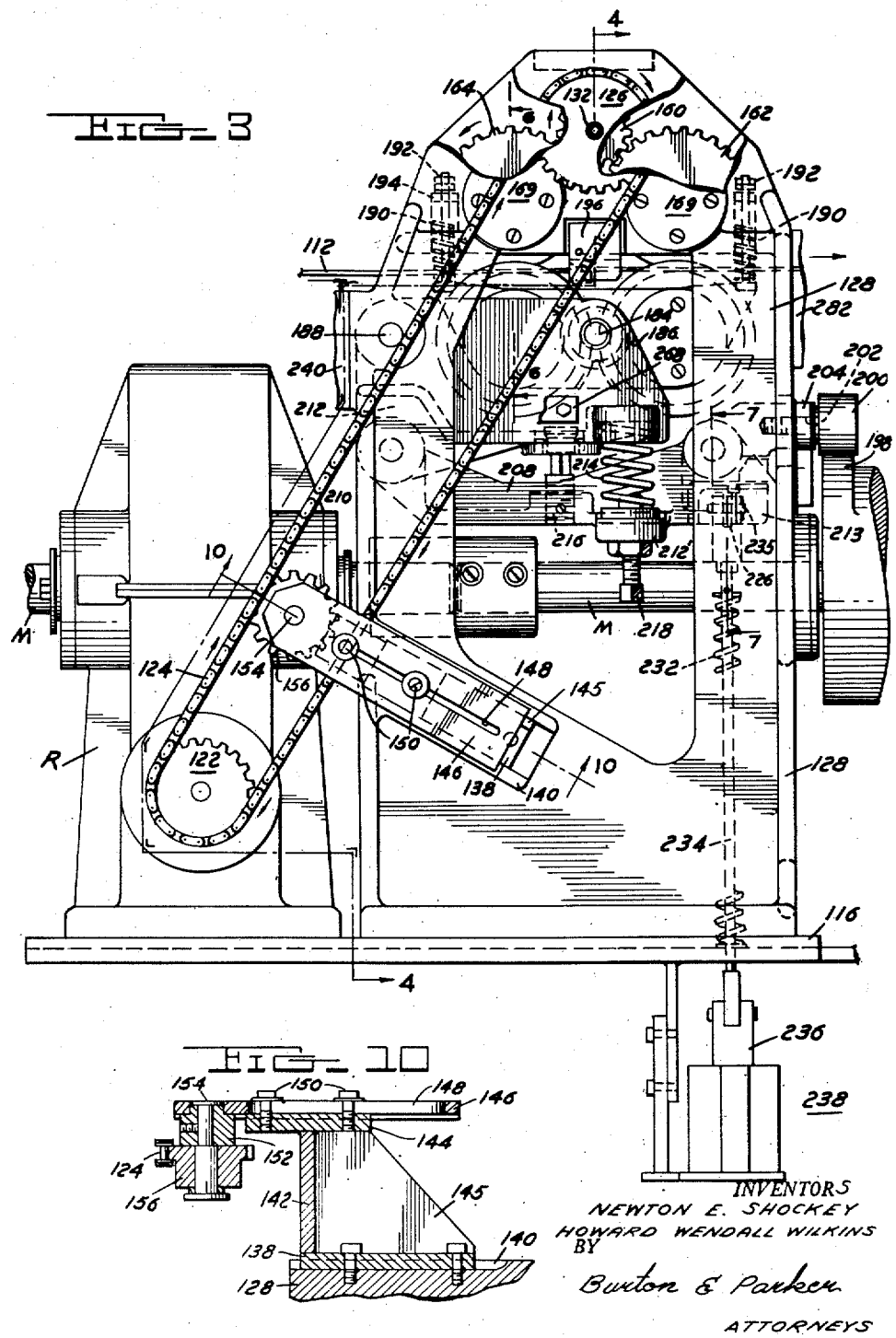

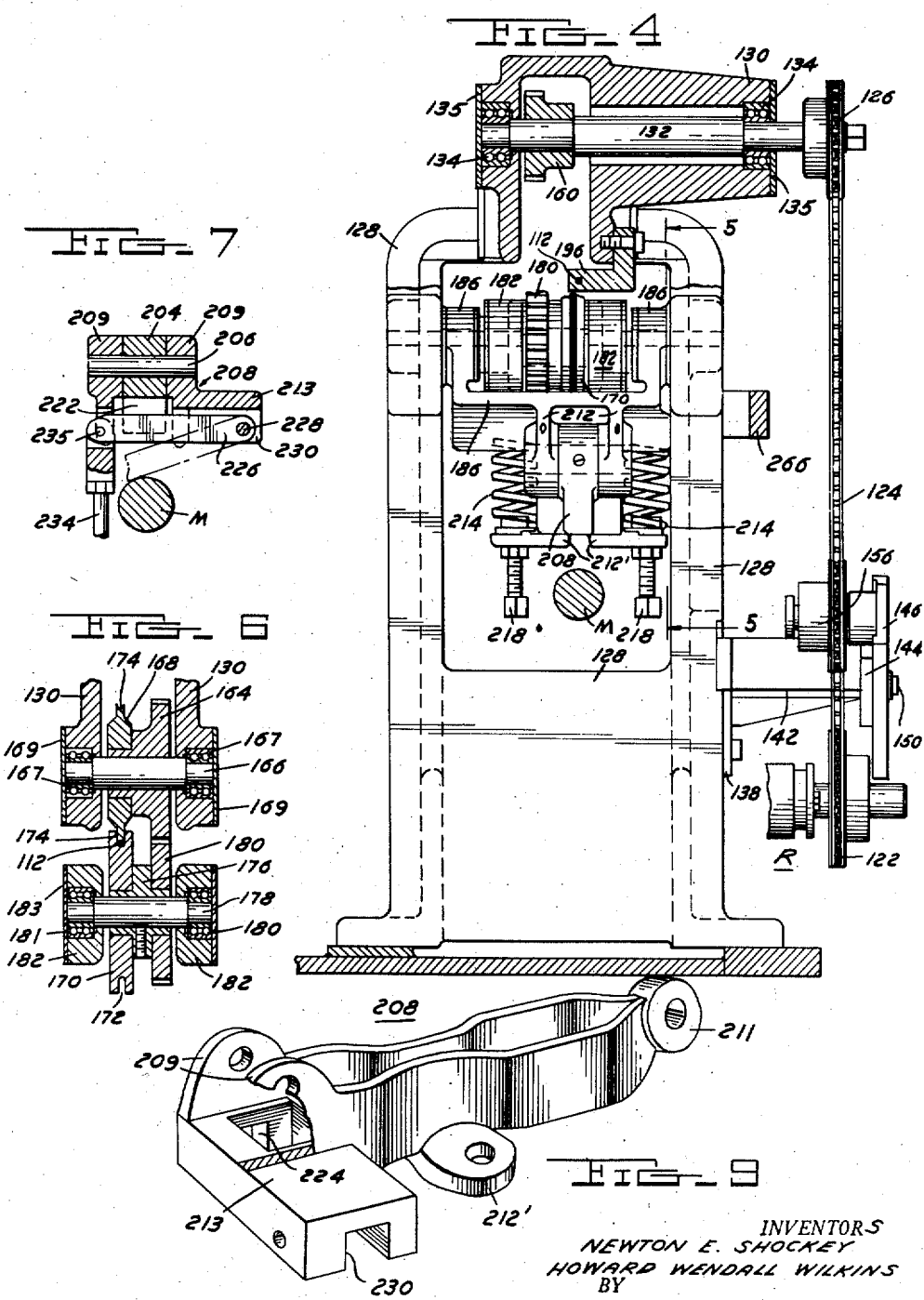

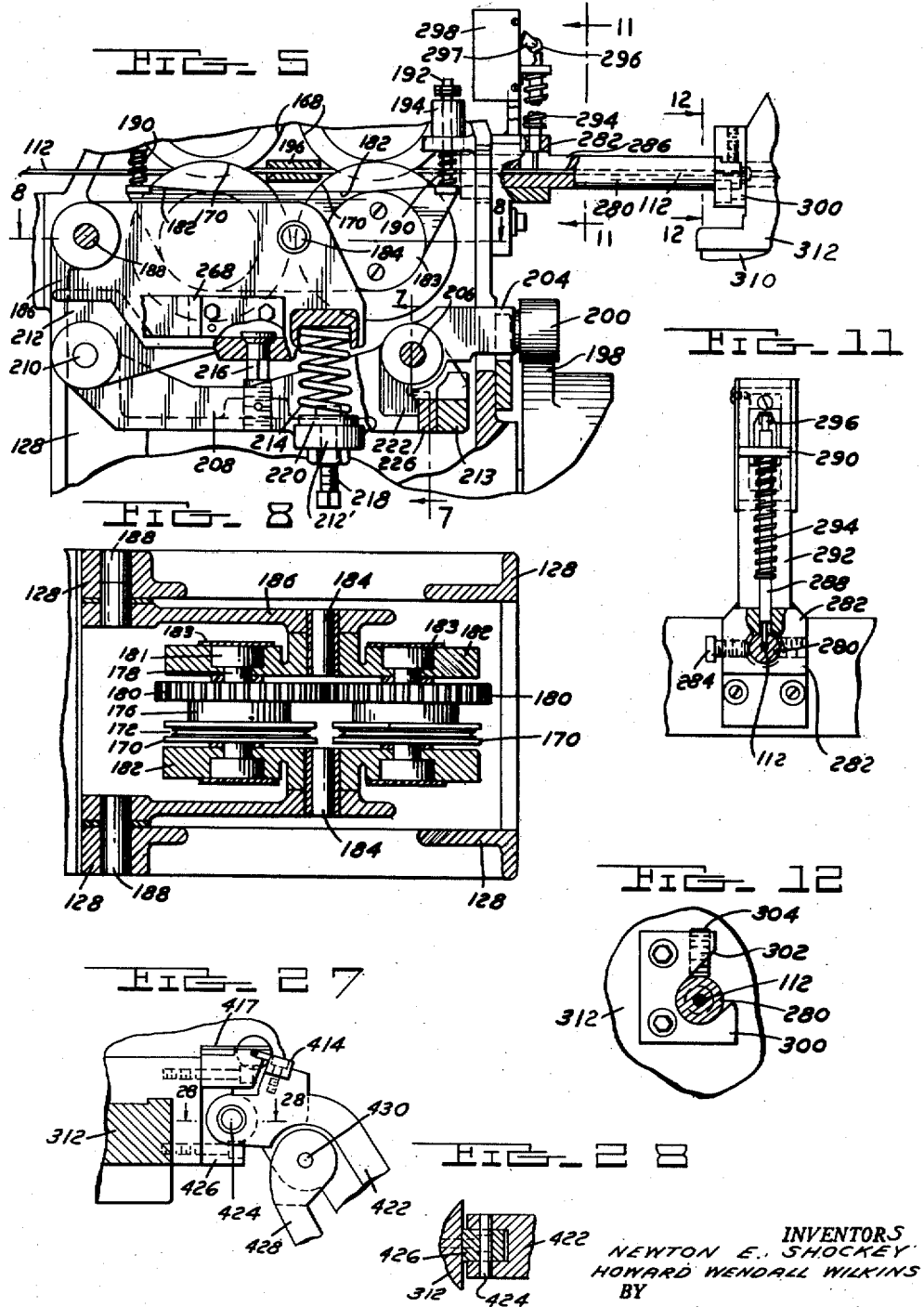

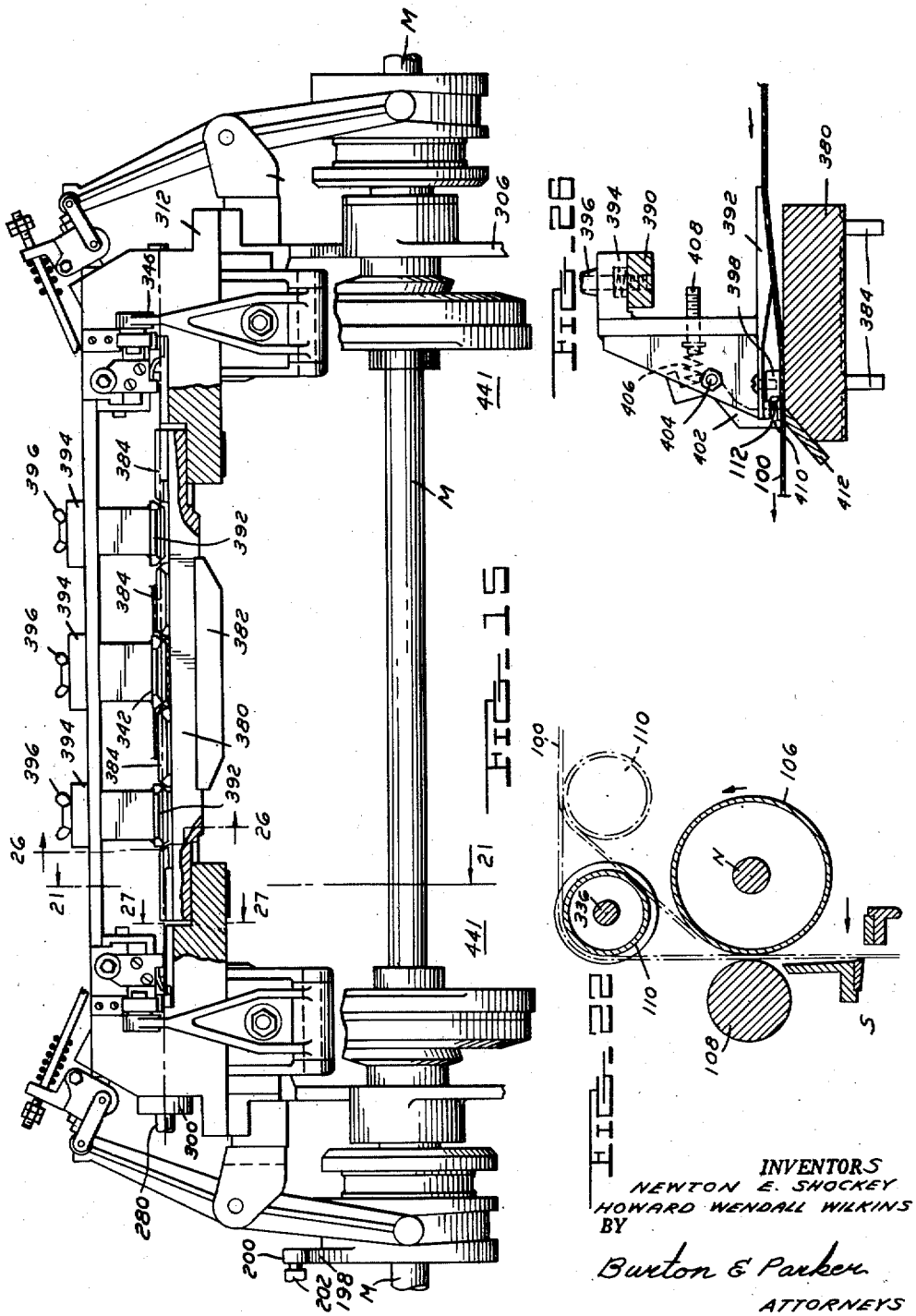

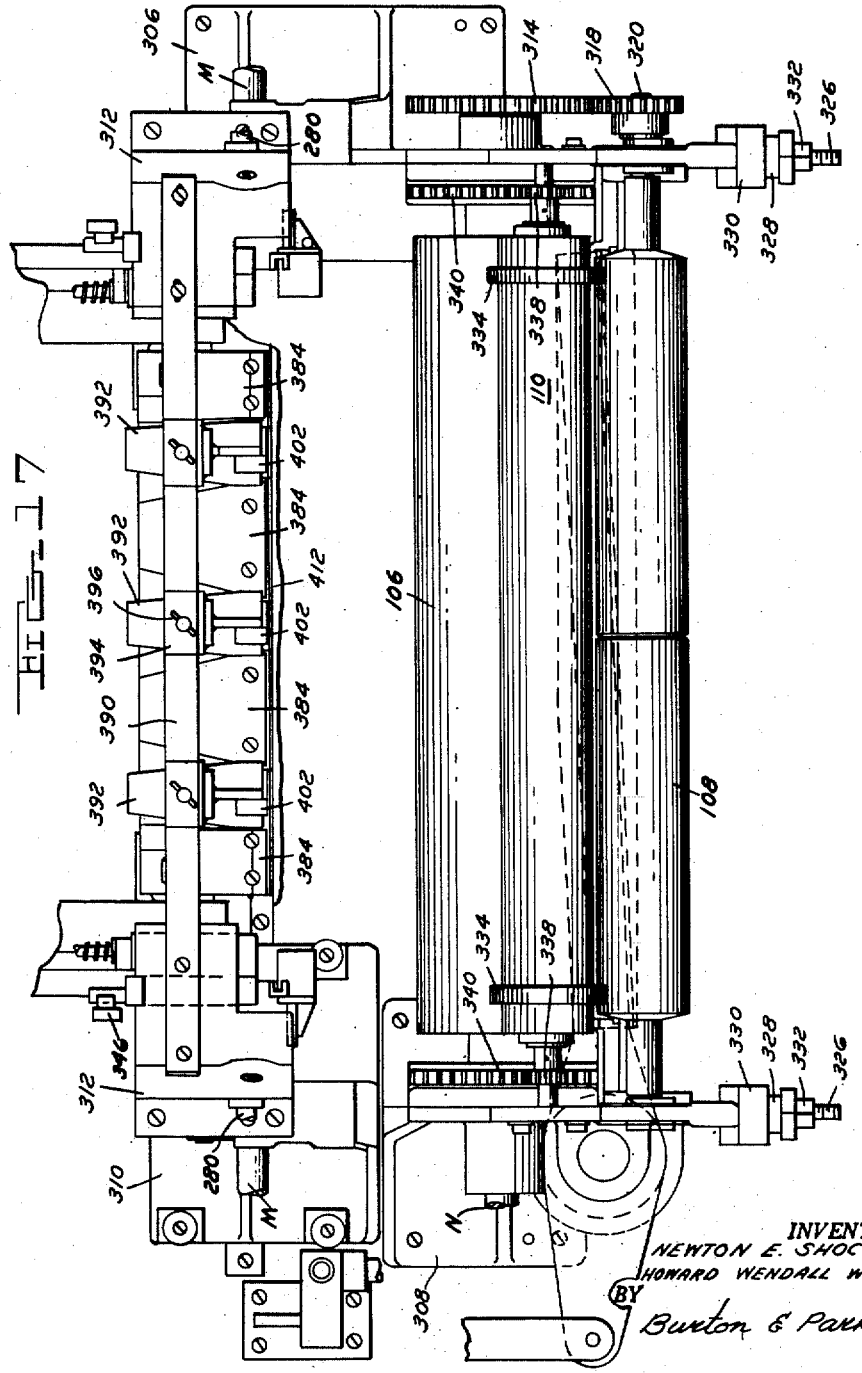

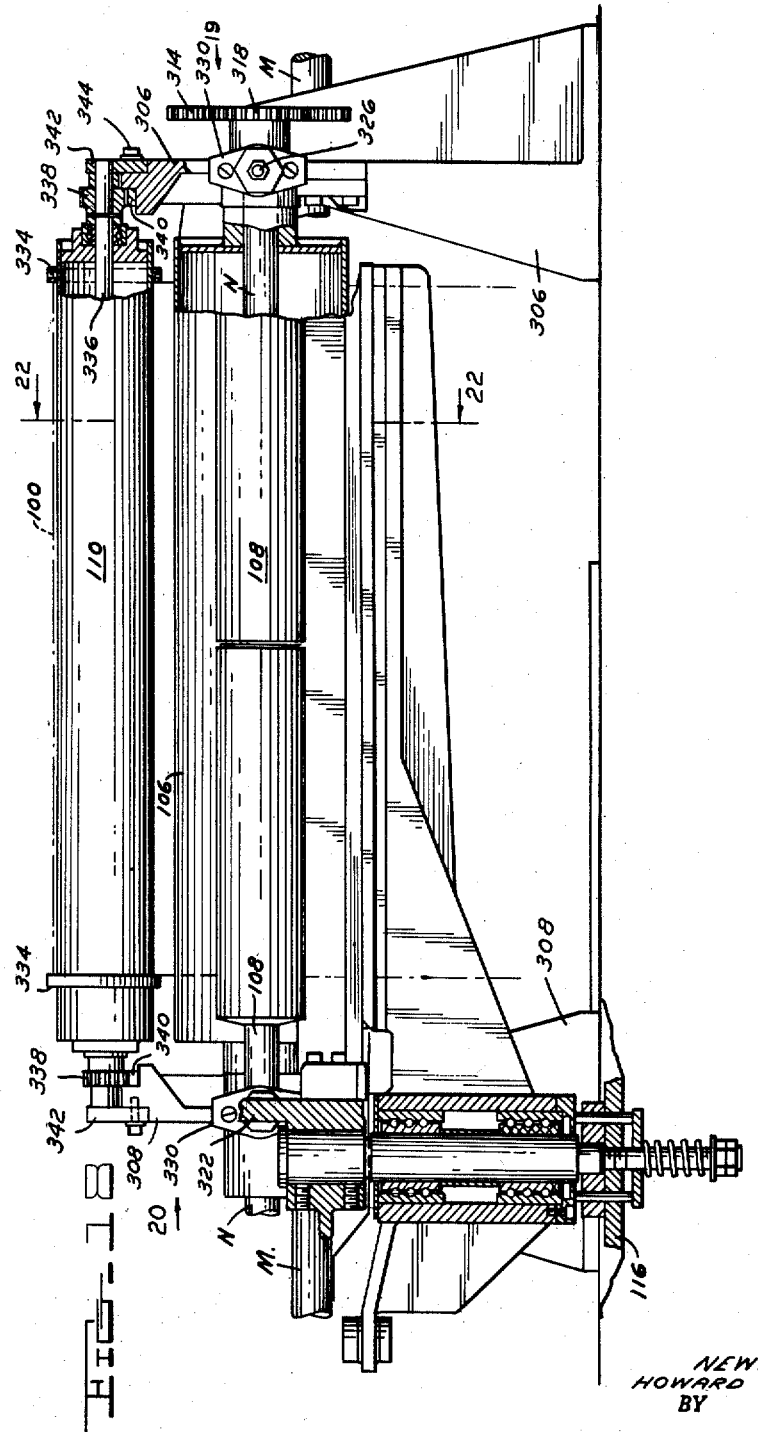

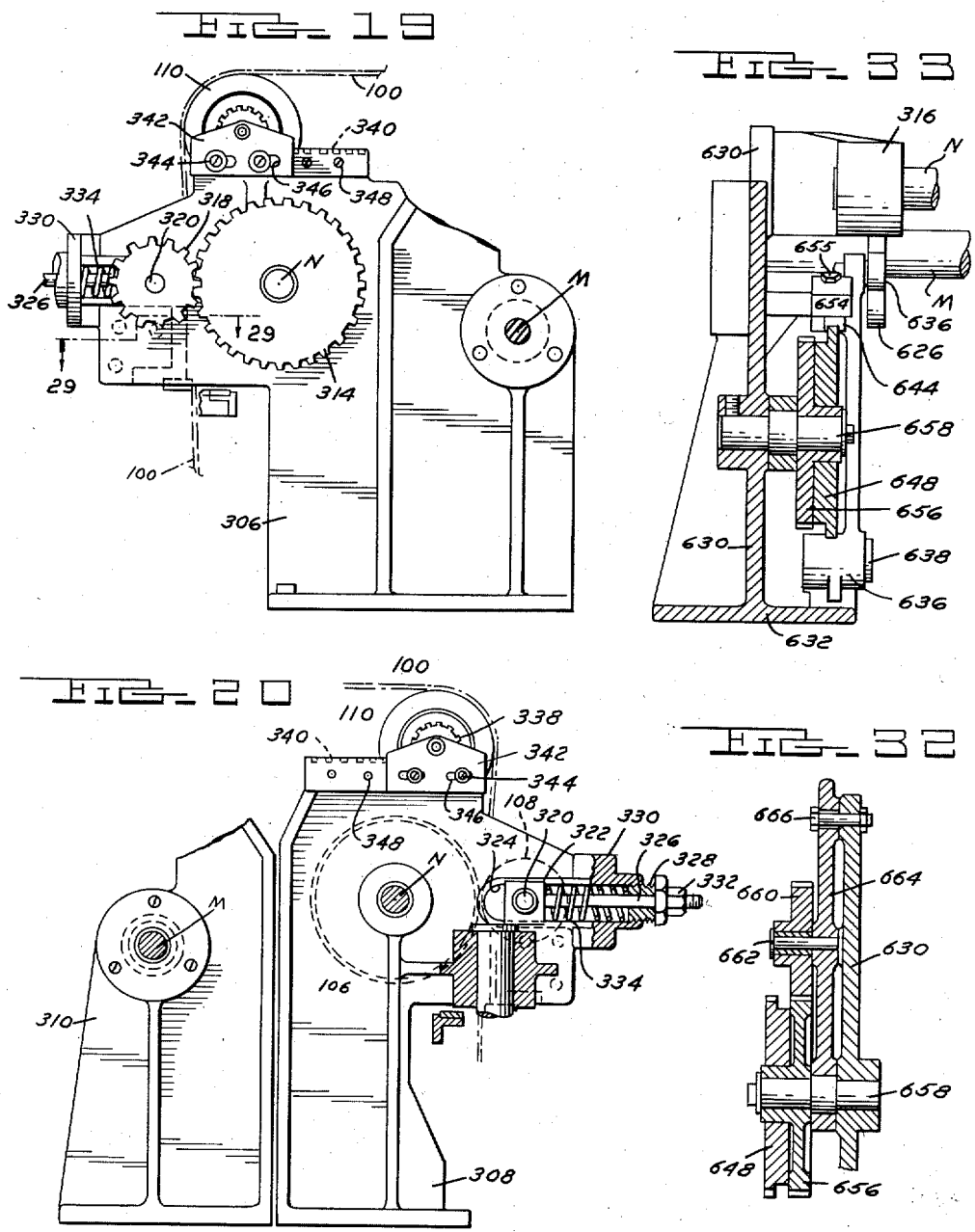

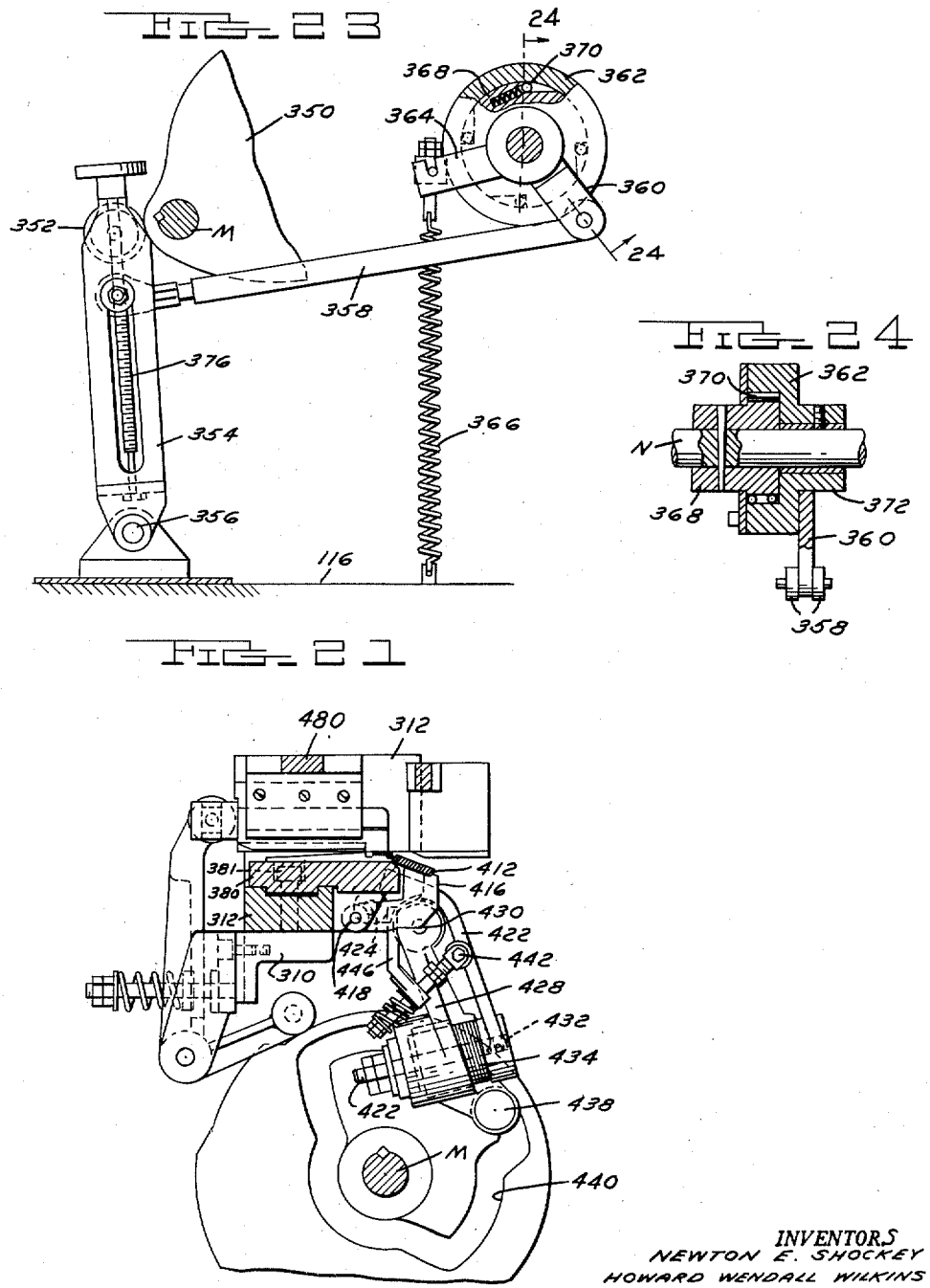

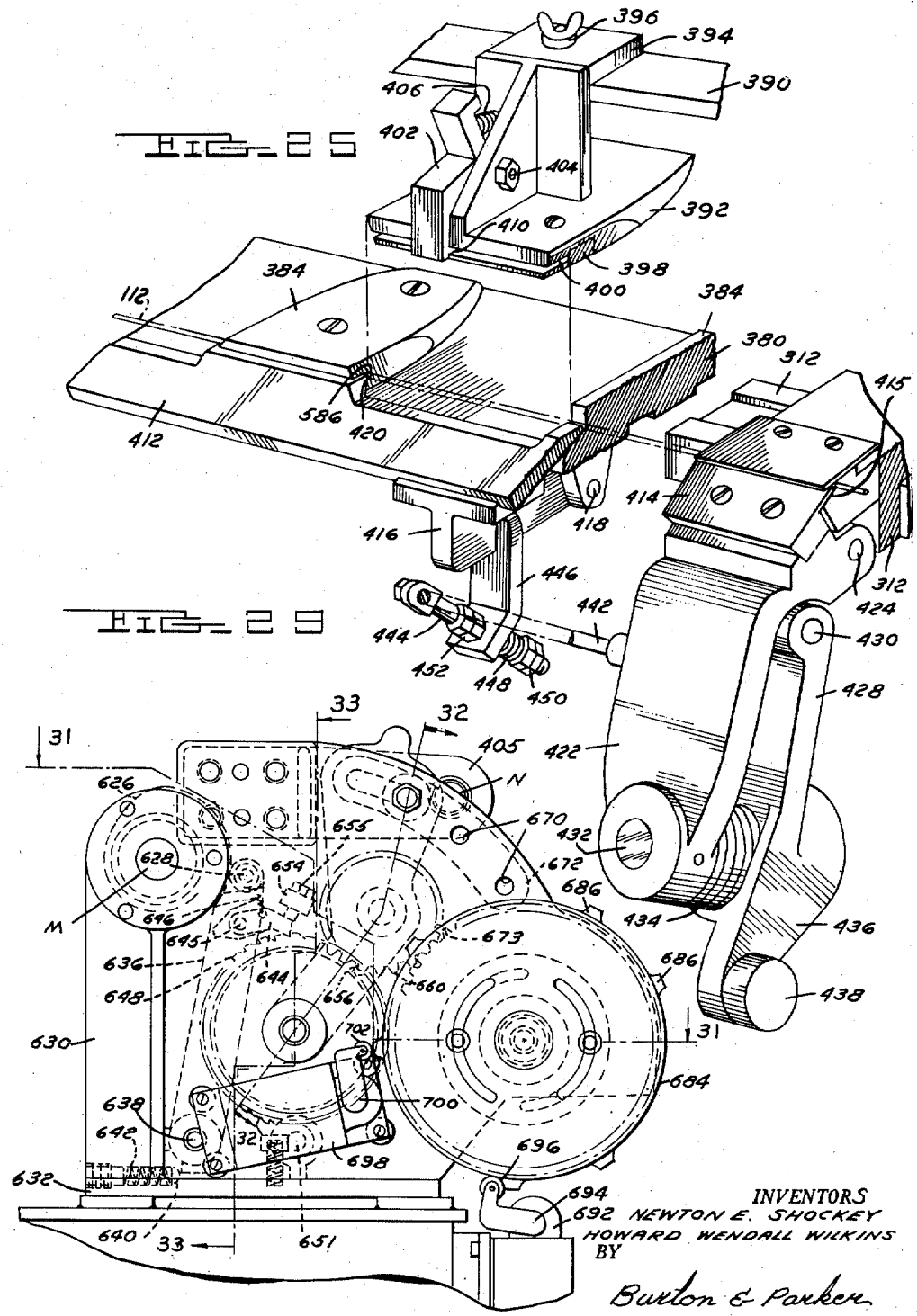

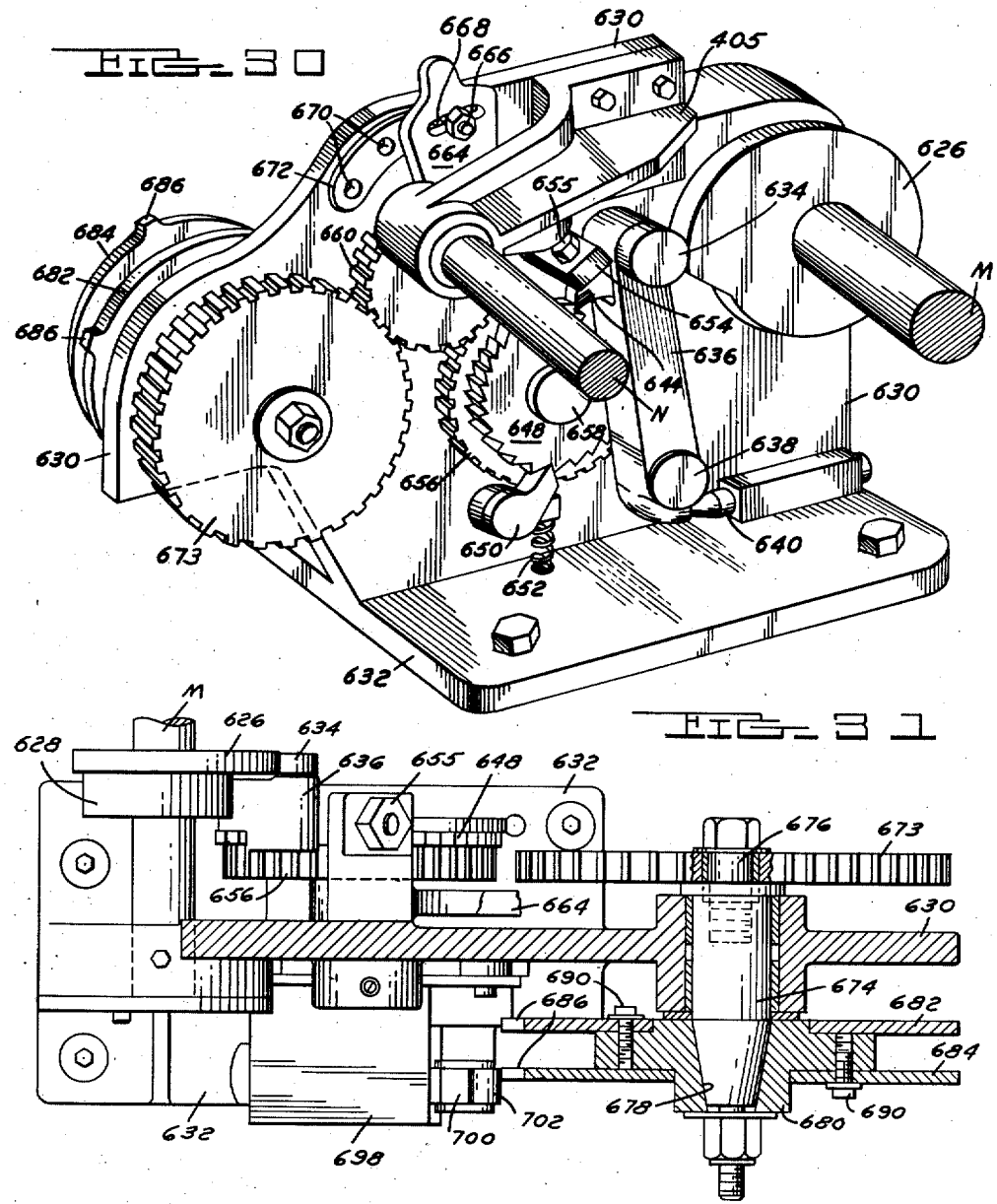

United States Patent Office 2,800,151
Patented July 23, 1957

2,800,151

MECHANISM FOR MAKING WIRE REINFORCED FABRIC SPRING LINERS OR THE LIKE

Newton E. Shockey, Detroit, and Howard Wendall Wilkins, Centerline, Mich., assignors to V. D. L. Corporation, a corporation of Michigan Original application May 17, 1950, Serial No. 162,496, now Patent No. 2,648,842, dated August 18, 1953. Divided and this application November 17, 1952, Serial No. 320,874

11 Claims. (Cl. 140—3)

This invention relates to improvements in mechanism for making wire reinforced fabric spring liners or the like.

This case, a division of our co-pending case Serial Number 162,496, now Patent No. 2,648,842, issued August 18, 1953, which relates to a wire feed and wire supporting mechanism and to a fabric advancing mechanism all of which are synchronously operable. A wire bending and cut-off mechanism and a fabric cut-off mechanism each of which are more particularly described in the co-pending case, operate in synchronism with the aforementioned mechanisms.

In the fabrication of automobile seat and back cushion spring liners comprising a fabric web transversely threaded with wire strands whose ends are bent over the margin of the web and the web then cut to sections of a desired length, it is desirable to perform all the attendant operations on one machine to reduce the cost of production. An integral part of the fabrication is the insertion of strands of wire transversely into the fabric web. Therefore it is an object of this invention to provide in a fabric spring liner fabricating machine, of the character above mentioned and specifically disclosed in our co-pending application Serial Number 162,496, a wire feed device which will insert wires transversely into a fabric web as the web passes through the machine.

Another object of this invention is to provide a wire feed mechanism which will insert a wire transversely into a fabric web in such a manner that the wire will pierce the web at several spaced apart points across the transverse extent of the web.

A further object of this invention is to provide in a spring liner fabricating machine a fabric web feed mechanism adapted to draw a fabric web through the machine in a step by step fashion and a wire advancing mechanism which is operable to insert a wire transversely into a fabric web so drawn through the machine during the pauses between the step by step advance of the web.

A still further object is the provision in a fabric spring liner fabricating machine of mechanism operable to advance a wire transversely through a fabric web at spaced apart intervals along the lineal extent of the web as it passes through the machine, and being adjustable to determine the spacing between said intervals.

An even further object is to provide in a machine for making automobile cushion spring liners a fabric web advancing mechanism operable to advance a fabric web through the machine in a step by step manner with a pause following each step, and adjustable to vary the amount of web that passes through the machine during each advancing step.

A meritorious feature is the provision in a fabric spring liner fabricating machine adapted to draw therethrough a fabric web in a step by step fashion, of a wire feed mechanism operable to advance a wire transversely through the web passing through the machine during the pauses intermediate the step by step movement of the fabric, and being adapted to suspend such wire advancing movement during certain of said pauses.

As the fabric web is drawn through the machine the web is fluted and the wire is inserted through these fluted portions. The wire is then cut off and bent over the marginal edges of the web. Therefore, another object is to provide a machine of the class described provided with complementary upper and lower sets of fluting shoes adapted to flute a fabric web travelling therebetween, said shoes being provided with aligned wire guide channels through which a wire is advanced as it is thrust through the flutes in the fabric, and provided with wire holding means adapted to hold stationary that section of the wire thrust through the fabric while the wire is cut off and as its ends are bent over and clenched into the fabric. Such wire holding means has one position at which it holds the wire stationary, a second position at which it is partially open and provides a guide for the wire, and a third completely open position at which the fabric web may be advanced thereover.

The machine is provided with improved wire feed mechanism which responds at desired intervals to feed the wire through pleats formed in the fabric and which includes wire holding and braking mehanism functioning in timed relationship therewith and adapted to hold the wire against advance except when it is desired to advance the same. Such wire braking mechanism is operatively coupled with the wire feed mechanism so that simultaneously with the rendering of the wire feed inoperative the brake automatically grips the wire and holds it stationary.

A meritorious feature of the wire feed mechanism is that it comprises two opposed pairs of complementary wire feed rolls, one pair of which is constantly driven and the other pair of which is held away from driving engagement with the wire and away from the first pair except at those times when it is desired to advance the wire when such pair of rolls is moved into co-operative driving relationship with the first pair of rolls and grips the wire thereagainst to be driven thereby. The movable pair of rolls is cam actuated. The driving coupling between the cam and such pair of rolls includes a part which is normally interposed therein to make the coupling complete so that the rolls are actuated for each revolution of the cam. Such part is subject to control of timing mechanism so that it may be withdrawn from such coupling permitting the cam actuated part of the coupling to move idly during one revolution of the cam without actuating the rolls and therefore without feeding the wire.

In the path of advance of the wire through the wire guide there is provided a point at which the switch is positioned at such point to be engaged and tripped by the buckling of the wire. This safety switch when tripped stops the machine.

More particularly, the machine includes a rotatably driven shaft and fabric advancing mechanism operatively coupled with the shaft to respond to each revolution thereof to advance the fabric web a single step with a pause following each step, and wire feed mechanism operatively coupled with the shaft to respond to each revolution thereof to thrust a wire transversely through the web during the pause following each step of a determined number of steps. As disclosed more particularly in our above mentioned co-pending application a wire cut off and end shaping mechanism is operatively coupled with the shaft to respond to each revolution thereof to cut off the section of wire thrust through the web and to bend the ends of the section over the marginal edges of the web. In addition a web severing mechanism is operatively coupled with the shaft to respond to a determined succession of revolutions thereof to sever the web during a selected pause in its advance.

Such shaft is shown as provided with a plurality of cams so relatively formed and arranged and coupled with the several operating devices of the machine that the fabric feed mechanism responds once during each revolution of its cam to advance the web a single step and to provide a pause following such step, the wire feed mechanism responds during each revolution of its cam to thrust a wire through the web during the web pause following each step in advance of a selected number of steps, the wire cut off and end shaping mechanism respond to each revolution of its cam to cut off each section of wire thrust through the web and bend the ends over the margins of the web, and wire feed control means responds to the revolution of its cam to render the wire feed mechanism inoperative for that revolution of the shaft following a determined selected number of shaft revolutions, and web severing mechanism responds to the revolution of its cam to sever the web following said selected number of shaft revolutions.

Another object is to provide, in a machine of the class described having a rotatably driven cam shaft provided with a plurality of cams one for each of the operating devices of the machine such as, for example, the fabric feed, the wire feed and supporting mechanism, and the skip feed for the wire feed mechanism, certain mechanisms which respond to each rotation of their cams to perform their functions and other mechanism which respond only to a predetermined number of revolutions of their cams to perform their functions. The mechanisms which respond to a predetermined number of revolutions of their cams to perform their functions may respond by having a part interposed in the driven connection from the shaft which part renders the connection operative, or by having a part withdrawn from its driving relationship in the driven connection from the shaft which withdrawal renders the driving connection inoperative.

In the drawings:

Fig. 1 (Sheet 1) is a schematic illustration of the operation designed to be carried out by the machine of this application;

Fig. 2 (Sheet 2) is a front elevation of a machine assembly which is adapted to perform the operation illustrated in Fig. 1;

Fig. 3 (Sheet 3) is a back elevation of the wire feed mechanism portion of the machine;

Fig. 4 (Sheet 4) is a vertical section taken on line 4—4 of Fig. 3;

Fig. 5 (Sheet 5) is a vertical section taken on the line 5—5 of Fig. 4 showing the structure partly in elevation;

Fig. 6 (Sheet 4) is a vertical section taken on the line 6—6 of Fig 3; being a fragment of the wire feed mechanism;

Fig. 7 (Sheet 4) is a vertical section taken on the line 7—7 of Fig. 3;

Fig. 8 (Sheet 5) is a horizontal sectional view looking downward taken on the line 8—8 of Fig. 5;

Fig. 9 (Sheet 4) is a perspective of the subframe portion of the wire feed assembly shown in Figs. 4 and 5;

Fig. 10 (Sheet 3) is a cross section taken on the line 10—10 of Fig. 3 showing the mounting of the adjustment for the chain tightener for the wire feed mechanism;

Fig. 11 (Sheet 5) is a vertical sectional view taken on the line 11—11 of Fig. 5 showing the wire buckling safety switch control mechanism and the bracket support for one end of the wire guide sleeve extending between the wire feed mechanism and the main portion of the machine partly in elevation;

Fig. 12 (Sheet 5) is a vertical sectional view taken on the line 12—12 of Fig. 5 showing the bracket support at the machine for the other end of the wire guide sleeve;

Fig. 13 (Sheet 6) is a side elevation of the wire straightener mechanism associated with the wire feed;

Fig. 14 (Sheet 6) is a top plan view of the wire straightener mechanism shown in Fig. 13;

Fig. 15 (Sheet 10) is a fragmentary back elevation showing the intermediate portion of the main shaft provided with its cams and showing the upper and lower bridges and the pleating shoes carried thereby between which the fabric web is passed to pleat the same;

Fig. 16 (Sheet 6) is a section taken on the line 16—16 of Fig. 13.

Fig. 17 (Sheet 8) is a top plan view of the main portion of the machine indicated by the letter B in Fig. 2;

Fig. 18 (Sheet 9) is a front elevation of the machine shown in top plan view in Fig. 17;

Fig. 19 (Sheet 11) is an end elevation looking in the direction of the arrow 19 in Fig. 18;

Fig. 20 (Sheet 11) is an end elevation looking at the opposite end of the machine and in the direction of the arrow 20 in Fig. 18;

Fig. 21 (Sheet 7) is a vertical sectional view taken on the line 21—21 of Fig. 15 looking in the direction of the arrow;

Fig. 22 (Sheet 10) is a vertical sectional view taken on the line 22—22 of Fig. 18;

Fig. 23 (Sheet 7) is an elevation of the fabric feed roll actuating mechanism taken on the vertical section line 23—23 of Fig. 2;

Fig. 24 (Sheet 7) is a vertical sectional view taken on the section line 24—24 of Fig. 23;

Fig. 25 (Sheet 12) is a perspective of separated fragments of upper and lower bridge members and cooperating fluting shoes;

Fig. 26 (Sheet 10) is a fragmentary vertical sectional view taken on the line 26—26 of Fig. 15 through the upper and lower bridge assemblies;

Fig. 27 (Sheet 5) is as cross sectional fragmentary view taken on the line 27—27 of Fig. 15;

Fig. 28 (Sheet 5) is a fragmentary horizontal sectional view taken on the section line 28—28 of Fig. 27;

Fig. 29 (Sheet 12) is an end elevation taken from the left end of Fig. 2 showing the operating mechanism and its support for the two timing switches mounted on the bed plate of the machine;

Fig. 30 (Sheet 13) is a perspective of the operating mechanism and its support for the two timing switches taken from the opposite side as compared to the view of Fig. 29;

Fig. 31 (Sheet 13) is a horizontal sectional view taken on the section line 31—31 of Fig. 29;

Fig. 32 (Sheet 11) is a vertical sectional view taken on the line 32—32 of Fig. 29;

Fig. 33 (Sheet 11) is a vertical sectional view taken on the line 33—33 of Fig. 29.

In Fig. 1 the operation of the machine is illustrated schematically. Burlap or other usable fabric 100 is withdrawn from a suitably supported roll 101 and fed lengthwise through the machine. This fabric may be provided in any desired width. The opposite longitudinal edges of the burlap may be folded over and stitched down as at 102 through the employment of any conventional mechanism suitable for the purpose. At 103 suitable fabric folding means is diagrammatically illustrated and at 104 stitching means is diagrammatically illustrated.

As the burlap enters the machine it passes between the upper and lower complementary burlap pleating shoes which form a plurality of parallel longitudinally extending pleats in the burlap. The fabric is drawn forwardly through the machine by feed rolls 106 and 108. It passes over a guide roll 110 which guide roll is spaced between the pleating shoes and the feed rolls. The fabric is drawn forwardly in a succession of steps which steps alternate with pauses in the forward movement of the fabric. During the pauses in the advance of the burlap a reinforcing wire 112 is thrust transversely through the pleats formed in the fabric. Such wire is cut off and bent over a marginal fold of the burlap and clenched thereinto as hereinafter described.

It will be seen in Fig. 1 that a succession of wire sections 112 are arranged in spaced parallel relationship as a group. A second group of similarly spaced wires likewise indicated at 112 is shown spaced ahead of the first group a distance greater than the spacing between the individual wires in the group. This spacing of greater length provides a blank interval through which the fabric is severed by mechanism hereinafter described.

A reel of reinforcing wire is indicated in Fig. 1 at 114. Wire is withdrawn therefrom by wire feed mechanism indicated generally as W and advanced through the pleats in the burlap. This wire feed mechanism advances the wires in a step by step movement. The intermittent advance of the wire is coordinated with the intermittent advance of the burlap so that the wire is thrust through the pleats in the burlap during the pauses in the advance of the burlap and the burlap is drawn forwardly during the pauses in the advance of the wire and after the wire section thrust through the burlap has been cut off. There is a skip feed in the advance of the wire which provides the extra length intervals between successive groups of wires as shown in Fig. 1.

Positioned between the reel of wire 114 and the wire feed mechanism W there is disposed suitable wire straightening mechanism and wire holding and braking mechanism indicated generally in Fig. 1 as H.

In Fig. 2 the wire reel is omitted, but the wire 112 therefrom is shown at the top of the sheet as entering the wire straightening and holding mechanism H and the wire feed mechanism is generally there indicated as W. The wire is not shown as leaving the wire feed mechanism and entering the machine in Fig. 2, but that part of the machine which includes the burlap feed rolls and the pleating shoes is indicated in Fig. 2 generally by the letter B. The burlap severing mechanism or shears is indicated generally in Fig. 2 by the letter S and the timing mechanism which coordinates certain movements of the machine as hereinafter set forth is indicated by the letter T and is shown at the left of Fig. 5.

The various mechanisms referred to and which collectively make up the entire machine are shown in Fig. 2 as mounted upon a leg supported bed plate or table 116. An electric motor 118 is suspended below the table. This motor through driving means 120 drives a Reeves reduction drive device R through which Reeves device all of the mechanism of the machine is driven. The Reeves device drives a main shaft M upon which are mounted all of the various cams which actuate parts of the machine. This main shaft passes directly through the Reeves as shown particularly in Figs. 2 and 3. The main shaft M is shown in Figs. 2 and 3 as projecting beyond the end of the Reeves away from the machine and as having such end projection broken off. This was for the purpose of driving other mechanisms not shown in this application.

Fig. 3 is a back view and shows the Reeves device as provided with a driven sprocket 122 which drives a chain 124 which chain extends to a sprocket 126 of the wire feed mechanism W to drive the wire feed mechanism.

*Wire feed mechanism*

The wire feed mechanism W is supported upon the bed plate 116 adjacent to the Reeves device. The housing for the wire feed mechanism comprises a pair of spaced upright side frames 128. One of these upright frames is shown in elevation in Figs. 2 and 3. It is interiorly cut away as at 129 exposing operating mechanism supported between the two side frames. Mounted upon and superimposing the upright side frames 128 is a head casting 130. This head casting 130 supports the wire feed drive shaft 132. In Fig. 4 the shaft is shown as extending through the casting and journaled therein adjacent to its two ends as at 134. Cover plates 135 extend over the bearings. This drive shaft is a short shaft and projects at the rear beyond the head casting. Such projecting end is provided with a drive sprocket 126 fastened to the shaft. The drive chain 124 from the Reeves sprocket 122 extends about this sprocket 126 and drives the shaft 132.

A chain tightener adjustable to tighten the chain is shown in Figs. 3, 4 and 10. The chain tightener comprises a bracket provided with a base plate 138. This base plate is seated within a recess 140 in a side frame 128. It is secured within this recess to the side frame by screws or the like, as shown in Fig. 10. An arm 142 projects outwardly from the base 138 normally thereto and is provided at its outer end with a head portion 144. This head portion forms with the arm a part which is T-shaped in cross section. The bracket includes a reinforcing web member 145 which extends between the base and the head, as illustrated in Fig. 10.

A plate 146 is adjustably slidably seated upon this T-head 144, as shown in Figs. 3 and 10. This plate is recessed on its face which juxtaposes the T-head to seat thereover as shown in Fig. 10. Such plate is provided with a slot 148 which extends lengthwise of the plate. Fastening screws 150 are adjustably threaded in the head 144. These screws extend through the slot 148. They are provided with bead caps which overhang the margins of the slot and hold the sliding plate in adjusted positions to which it may be moved in tightening the chain.

The plate 146 is provided at its upper end with an inwardly projecting boss 152 which boss is fixed to the plate by welding or the like. A stub shaft 154 is carried by and projects inwardly of the boss toward the side frame 128. This stub shaft is secured to the boss by a set screw or the like (Fig. 10). A chain engaging sprocket 156 is rotatably journaled upon this stub shaft being held thereon by a head on the end of the shaft. It is apparent that by adjusting the sliding plate 146 upon the bracket head 144 the tension on the chain may be increased or decreased.

The wire feed drive shaft 132 has a gear 160 fixed thereon to rotate therewith. This gear, as shown in Fig. 4, is mounted within the head casting 130. The wire feed mechanism is driven by this gear 160. Such gear 160 meshes with and drives two gears 162 and 164 (Fig. 3) which gears are similar and similarly spaced upon opposite sides of the drive gear 160. These gears 162 and 164 are separately mounted upon separate shafts 166 which shafts are journaled in the opposite sides of the head casting upon bearings 167 closed by cover plates 169. One of these gears and its shaft is shown at the top of Fig. 6 (Sheet 4). Each gear has a wire feed roll 168 fixed thereto to rotate therewith. These two wire feed rolls are similar and they constitute the two upper wire feed rolls. These upper feed rolls are constantly driven because the two gears that carry them are always in mesh with and constantly driven by the gear 160. These two upper feed rolls with their gears constitute an upper wire feed roll assembly.

There is a lower wire feed roll assembly which includes two lower wire feed rolls 170 with their companion driving gears 180. One of these wire feed rolls and its gear is shown in Fig. 6. These two lower wire feed rolls are adapted to engage the two upper wire feed rolls to grip the wire therebetween.

Each lower wire feed roll is provided with a circumferential groove 172. Each upper wire feed roll is provided with a complementary circumferential rib 174. These ribs 174 of the two upper wire feed rolls fit within the grooves 172 of the two lower wire feed rolls. The wire 112 is held frictionally between the ribs and the bottoms of the grooves to be advanced upon rotation of the rolls.

Each lower wire feed roll 170 is fixed upon a hub 176 which hub is fixed upon a shaft 178. Each hub also carries a lower wire feed roll gear 180. Such gear 180 is in mesh with and is driven by its companion upper wire feed roll gear 164. The two upper wire feed roll gears are constantly driven by the gear 160 and the two lower wire feed roll gears in mesh with their companion upper wire feed roll gears. They are constantly in mesh with the two upper wire feed roll gears. Fig. 6 shows an upper wire feed roll 168 engaged with a lower wire feed roll 170 and the rib 174 of the upper roll holding the wire against the bottom of the groove 172 in the lower roll. While the upper and lower wire feed rolls are constantly driven, the feeding of the wire is intermittent due to the fact that the lower wire feed roll assembly is periodically swung downward so that the wire is released. The downward swing of the lower wire feed rolls is small, being insufficient to break the driving engagement of the upper and lower wire feed roll gears. It is sufficient, however, to release the wire so that it is no longer gripped between the rolls to be driven thereby.

The two lower wire feed rolls 170 and their gears 180 are shown in Fig. 8, Sheet 5. Each of the two shafts 178 upon which a lower wire feed roll and its gear is mounted is itself journaled at opposite ends within bearings 181 within a cradle frame 182. Cover plates 183 close the ends of the bearings over the ends of the shafts. This cradle 182 is pivotally supported upon the trunnions 184 between the two side plates of a swinging frame 186, as shown particularly in Fig. 8. This swinging frame 186 is pivotally supported at one end upon trunnions 188 carried by the wire feed mechanism upright frame members 128. (Note Figs. 3, 5, and 8.)

The normal position of the cradle 182 and the swinging frame 186 which carries the cradle is swung down away from the upper wire feed roll assembly. Such downward drop is insufficient to withdraw the lower wire feed roll gears 180 out of driving engagement with the upper wire feed roll gears 164 but is sufficient to move the lower wire feed rolls away from the upper wire feed rolls so that the wire is no longer gripped therebetween to be driven thereby. As the swinging frame and cradle drop down, the lower feed rolls withdraw away from the upper feed rolls and away from the wire so that the advance of the wire is interrupted. The lower wire feed rolls then rotate idly and the wire remains stationary.

The wobble or cradle swing of the cradle 182 upon its trunnions 184 on the swinging frame 186 is yieldingly limited by expansion coil springs 190, shown in Figs. 3 and 5. These springs encircle pins 192 carried by and extending upwardly from ears on the sides of the cradle through lugs 194 of the stationary frame. These springs extend between the ears and the lugs. When the swinging frame 186 drops these springs 190 act upon both ends of the cradle to maintain it upon an even keel so that both of the lower wire feed rolls will disengage the wire. These springs also serve to maintain the cradle on an even keel when it is raised thereby causing the two lower wire feed rolls to be brought into engagement with the wire and hold it up against the two upper wire feed rolls.

A stationary guide 196 for the wire is shown in Figs. 3 and 5. Such wire guide is disposed between the two pairs of upper and lower wire feed rolls and approximately directly above the pivotal support 184 of the cradle. This wire guide 196 is shown in Figs. 3 and 4 as in the form of an angular bracket fixed to the frame and provided with a wire guide passageway therethrough for the wire.

This lower wire feed roll assembly is adapted to be raised by cam operated mechanism. A wire feed control cam 198 is fixed on the main shaft M, Figs. 3 and 5 to rotate therewith. This main shaft M which extends through the Reeves device (Fig. 2) is continuously driven. This cam is also shown in Fig. 15, Sheet 10. Fig. 15 shows the main shaft cams. A roller 200 carried by the swinging frame assembly rides on the periphery of this wire feed control cam. Such roller rises and falls with the rotation of the cam to raise and lower the lower wire feed roll assembly into and out of its wire feeding engagement with the upper wire feed roll assembly.

This roller 200 is journaled directly on a stub shaft 202. This shaft is fixed to the outer end of an L-shaped arm 204, as shown in Fig. 5. Such arm 204 is pivoted at 206 to the outer end of a swinging subframe 208 which subframe is hinged at its opposite end upon a pivot 210. This pivot is carried by lugs 212 which lugs depend below the swinging frame 186. (Note Figs 3, 4 and 5.) The shape of this subframe is shown in Fig. 9, Sheet 4. The subframe extends from its hinge pivot 210 underneath and spaced below the swinging frame, as shown particularly in Fig. 5.

The subframe 208 is provided with spring pads 212 projecting laterally from opposite sides (Figs. 3, 5 and 9). These two spring pads support two heavy springs 214. These springs in turn hold the free end of the swinging frame 186 upwardly (Fig. 5). The upper ends of these springs 214 seat within rests in the bottom of the swinging frame. The subframe is coupled with the swinging frame to prevent too great a separation therebetween by an upright connecting pin 216. Such pin is adjustably threaded into the subframe and extends upwardly therefrom freely through a provided aperture in the swinging frame, as shown in Fig. 5. The tension of the springs 214 is adjustable by means of adjustment screws 218 threaded through the spring pads 212 and provided with plates 220 which plates rest directly underneath the springs.

As shown in Fig. 9 the subframe has an apertured end 211 which is mounted upon the pivot 210. The opposite end of the subframe is provided with a pair of spaced apart apertured ears 209 which carry the pivot 206 upon which pivot the swinging arm 204 is mounted. The subframe is generally fork shaped and the two forks terminate in the ears 209. These fork portions are connected together by a web so that the subframe constitutes a strong integral structure. The spring pads 212 are extensions laterally of the connecting web. This web is also extended to provide a channel-shaped member 213 having a downwardly open channel 230. The L-shaped roller carrying arm 204 which is pivoted upon the pin 206 between the ears 209 of the subframe has a downwardly projecting portion 222 (Figs. 5 and 7). This portion 222 of the arm has permitted swinging clearance within a cut away opening 224 of the channel portion 213 of the subframe, as shown particularly in Fig. 9 and which is provided for a purpose hereinafter described.

A control bar 226 is pivotally supported at one end upon a pivot 228 within the channel 230 formed in the part 213 of the subframe, as shown in Figs. 7 and 9. This control bar is normally held upwardly at the position shown in solid line in Fig. 7 and as also shown in Figs. 3 and 5 by a long spiral spring 232 which spring encircles a rod 234, Fig. 3. Such rod has its upper end pivoted at 235 to the outer end of the control bar. The rod is coupled at its lower end with a solenoid plunger 236. The solenoid assembly which includes the plunger is indicated in Fig. 3 as 238. This solenoid forms a part of timing mechanism hereinafter described under such heading. At determined intervals the solenoid is energized to draw the plunger and the rod 234 down against the resistance of the spring 232 and to withdraw the control bar 226 to the position shown in dotted outline in Fig. 7.

When the rod is drawn downwardly so that the control bar 226 is swung to the position shown in dotted outline in Fig. 7 such bar is pulled out of the channel 230 and the lower end 222 of the L-shaped roller carrying arm 204 is free to swing within the cut away opening 224 in the subframe. When this occurs lifting of the roller 200 by cam 198 does not lift the subframe 208 and the swinging frame 186. The roller carrying arm at such times swings idly upon its pivot 206 and the lower end 222 of the arm swings freely within the cut away opening 224.

It will be understood that as the main shaft M rotates continuously during the running for the machine the cam 198 lifts the roller 200 once for each revolution of the shaft. When the control bar 226 occupies the solid line position shown in Figs. 5 and 7 lifting of the roller 200 lifts the subframe 208 and the swinging frame 186 and the cradle 182. At such time the roller carrying arm 204 cannot swing upon its pivot 206 because this is prevented by the presence of the control bar 226. Whenever the subframe and cradle are lifted, as described, the wire is gripped between the upper and lower wire feed rolls. As the wire feed rolls are continuously driven the wire is advanced as soon as it is gripped between the upper and lower sets of rolls. This advance continues only so long as the lower wire feed roll assembly is held upwardly, which is normally but a short arc of the main shaft M. The wire is fed forwardly rapidly when it is advanced.

During the pauses between the intermittent advances of the wire the wire is cut off, the ends are clenched over and the burlap is pulled forwardly to a new position to receive another wire. At those intervals when the timing mechanism operates to energize the solenoid and the rod 234 draws the free end of the control bar 226 down and the roller carrying arm 204 swings idly there occurs what might be termed a skip feed of the wire. It is this skip feed of the wire which produces the extra length intervals between the groups of wire previously mentioned in the discussion of Fig. 1 and shown in such figure.

It is desirable that the wire be as straight as possible and free from kinks when it enters the wire feed mechanism. For this purpose wire straightening mechanism is provided. Such wire straightening mechanism is shown in Figs. 13 and 14, Sheet 6. Such wire straightener is supported by a bracket or platform 240 mounted at one side of the wire feed mechanism and supported upon the two side frames 128 of the wire feed mechanism. Such wire straightener comprises one series of vertically disposed hardened rollers 242 between which the wire 112 is drawn by the wire feed rolls and a second series of horizontally disposed hardened rollers 244 arranged in line with the vertically disposed series of hardened rollers. Such wire straightener serves to straighten the wire in both the vertical and horizontal planes. From this straightening mechanism the wire passes between the wire feed rolls.

It is not only necessary that after the wire has been thrust through the fabric that its advance be stopped in order that it may be cut off and have the ends of the cut off section bent over, but it is also necessary that the advance of the wire from which the section has been cut off be abruptly halted. Such stoppages of the advance of the wire takes place by gripping the wire securely at a point between the wire carrying roll 114 and the wire straightening mechanism 240.

Upon the outer end of the wire straightener 240 there is mounted an opposed pair of wire gripping plungers carried by a housing 246. The upper plunger 248 is adjustably threadedly mounted within the housing. The housing is cut away providing an opening 250 and the wire gripping end of the plunger 248 is visible within this opening (Fig. 13). This upper plunger is stationary except that it has this permitted adjustment. A wire guide nose 252 is shown on the face of the housing 246 and through which the wire is guided to enter the housing between the plungers. There is a lower plunger 254 which is adapted to be raised to grip the wire between the lower plunger and the upper plunger or to be lowered to permit the advance of the wire.

This lower plunger 254 is adjustably mounted within a socket 256 carried by brake lever arm 262. This socket is provided with a pivot 258 which pivot is mounted within a slot 260 in the brake lever arm. The arm 262 is swingably supported at 264 upon the outer end of a brake lever 266. This lever 266 is fixed at 268 to the swinging frame 186 to swing with such frame. The outer end of this lever 266 has an upwardly offset rigid end section 270 provided with an oversize passageway 272 through which the socket part 256 extends and within which it is permitted to float, as shown in Fig. 16. The swinging brake lever arm 262 is held yieldingly upwardly toward the offset extension 270 of the brake lever 266 by a spring 274. Such spring is carried by a pin 276 which pin is threaded into the offset end extension 270 and passes slidably through an aperture in the arm 262, as shown in Fig. 13.

When the swinging frame 186 of the wire feed mechanism drops down, as heretofore described, and releases the wire from between the wire feed rolls the outer end of the brake lever arm 266 swings upwardly and the plunger 254 grips the wire 112 against the upper plunger 248 and the wire is held stationary. The wire is therefore automatically gripped and held between the upper and lower plungers at all times when the lower feed roll assembly is dropped down away from the upper wire feed roll assembly.

The wire passes from the wire feed mechanism W into the machine through a sleeve or guide channel member 280, as shown in Fig. 5. A bracket 282 is fixed to one side of the wire feed mechanism frame by screws of the like shown in Fig. 11. This bracket is provided with a seat to removably support one end of the wire guide sleeve 280, the sleeve being held therein by a set screw 284, as shown in Fig. 11.

The opposite end of the wire guide sleeve 280 is supported upon the frame of the machine by a bracket 300 secured by screws or the like to the frame, as shown in Figs. 5 and 12. This bracket is cut away as at 302 and a set screw 304 is adapted to be threaded into this opening to hold the end of the sleeve therein. The sleeve may be readily removed from the bracket by releasing the set screws 284 and 304.

This wire guide sleeve is provided with an opening 286 which is the one free space between the wire feed mechanism W and the fabric feeding and pleating part of the machine B within which the wire can buckle. Should there be some failure on the part of the brake mechanism or the wire feed mechanism whereby the wire continued to fed after it was desired to stop the same and after its entrance into the burlap feeding and pleating part of the machine was blocked in some way, this opening 286 provides a space into which the wire could buckle upwardly.

A wire buckling safety switch device is provided to stop the machine upon buckling of the wire into this opening 186. This safety switch device has a plunger 288 which projects into the opening 286 and rests normally lightly on top of the wire, as shown in Fig. 11. The plunger is held down on the wire by a spring 294. The plunger is slidably supported within a guide 290 mounted upon an upwardly projecting backing plate 292 of a bracket 282. The upper end of the plunger is adapted to engage a roller 296 on the end of a safety switch lever 297. If the wire buckles it lifts the plunger and trips the safety switch. This switch is disposed in the control circuit for the machine and upon the tripping of the switch the circuit is broken and the machine is stopped.

*Wire cut off and end shaping mechanism*

The machine is provided with mechanism which serves to cut off and bend the opposite ends of the wire strands thrust through the fabric web over the margins of the fabric. The mechanism is more particularly described in my above mentioned co-pending application, but sufficient detail is herein set forth to provide a general picture of its operation.

Suitable fabric 100 such as burlap, is withdrawn from a roll of fabric and advanced through the machine, as herein described. During such advance this fabric is pleated lengthwise, as illustrated in Fig. 1 and the wire feed mechanism thrusts the reinforcing wire through the fabric during the pauses in its intermittent advance. That portion of the wire which has been thrust through the fabric is cut off and bent over selected parts of the fabric and clenched into the fabric. In the drawings, the fabric 100 is illustrated as having its margins folded over and stitched down to provide marginal folds or reinforcements 102 and the transverse reinforcing wire 112 are bent over these marginal folds 102 and clenched into the fabric. This is shown schematically in Fig. 1.

After the wire has been thrust through the pleats in the fabric the section of the wire so thrust through is cut off. Such section is not only cut off, but the extreme end of the section which has been thrust entirely through the fabric is also cut off. Such cutting off of the outer end of the wire section is done in order that the length of the wire section shall be accurately established and both ends of the wire section shall be accurately and correspondingly shaped so that the bending of the wire about the marginal folds of the fabric will be accurately accomplished. Such marginal folds of the fabric may, if desired, be otherwise reinforced and might even be formed in the fabric spaced to extend parallel to its margins. Similar wire cut off and end shaping devices are therefore provided on both margins of the burlap, as illustrated schematically in Fig. 1 by the reference identification WC.

The wire cut off and end shaping mechanism is mounted upon the end frame members of the machine B, Fig. 2. This machine B comprises fabric advancing and pleating means, fabric cut off means, and the wire cut off and end shaping means. In Fig. 2 this machine structure B is shown in front elevation in combination with other parts of the entire assembly. Fig. 17, Sheet 8, is a top plan view of the machine B. Fig. 18, Sheet 9, is a front elevation, partly broken away, about the pivotal support of the shears.

Fig. 19, Sheet 11, shows one end frame support 306 of the machine B which support is mounted upon the bed plate 116, Fig. 2. This end frame support is the one seen looking in the direction of the arrow 19 in Fig. 18. At such end the machine is provided with a single end frame member 306. At the opposite end of the machine there are provided two end frame members 308 and 310 shown in Fig. 20, Sheet 11. This Fig. 20 is taken looking in the direction of arrow 20 in Fig. 18.

The wire feed cut off and end shaping devices are operated by means driven from the main shaft M. This shaft M is journaled in the end frame member 306 and in the end frame member 310, as shown in Figs. 19, 20 and 15. Superimposing the end frame member 306 is a head casting 312. Superimposing the end frame member 310 is a similar head casting 312. These head castings support and generally carry the wire cut off and end shaping devices. They are fixed upon the end frame members by stub bolts or the like as shown in Fig. 21.

The wire bending and cut off mechanism is mounted within these head castings 312. The manner of mounting and the linkage serving to actuate this mechanism is not shown in the figures of this case, and for a more complete understanding of these details reference to our co-pending application if necessary. It suffices to say that the wire cut off and bending mechanism, comprising two units with one unit mounted adjacent each marginal edge of the fabric web upon head castings 312, receives each end of the wire section as it is thrust through the web, cuts off the wire and bends each end over the margins of the web.

It should be noted that in some of the figures certain cams, gears, rocker arms, and cam followers etc., are shown to which no reference is made. These are provided in the machine for such purposes as the actuation of the wire cut off and end bending mechanism, the fabric severing mechanism, and in certain instances the timing mechanism synchronizing the movements of such mechanisms. They are of no concern in the present description and reference must be had to our co-pending application for details of their operation.

Fabric feed mechanism

A strip of burlap 100 is drawn forwardly step by step from the supply roll 101 by the fabric feed rolls 106 and 108. The large roll 106 is mounted on the shaft N. This shaft N extends parallel to the main shaft M and is disposed forwardly thereof. It is supported within the end frame members 306 and 308 as shown in Figs. 17, 18 and 19. It extends at both ends beyond these frame members. It is driven in a step by step manner. This large feed roll shaft is provided outside of the end casting 306 with a large gear 314 which gear is fixed on the shaft as shown in Figs. 2 and 19. Sheets 2 and 11, respectively. The opposite end of this shaft is journaled at its extremity within a bracket 316 (Fig. 2) mounted on the end of the timing gear casting hereinafter described. That portion of the shaft extending between the end frame member 308 and the bracket 316 carries a one way clutch mechanism which responds to the rotation of a cam on the main shaft M to rotate the shaft N in a step by step manner.

This large gear 314 meshes with a small gear 318 mounted on the projecting end of a shaft 320 which shaft carries the small feed roll 108. The small feed roll 108 is held under spring tension toward the large feed roll 106. The opposite ends of the shaft 320 which shaft carries the small feed roll, are journaled within bearing blocks 322. (Fig. 20, Sheet 11.) These bearing blocks are slidably mounted within guideways 324 which guideways are formed in the end castings 306 and 308 providing permitted adjustable movement of the small roll 318 toward and away from the large roll 314. A pin 326 is threaded into each bearing block 322. This pin projects outwardly from the block and slidably through a stud 328, as shown particularly in Fig. 20, Sheet 11. This stud is threaded into a cap casting 330, which cap casting is secured to the end frame member 306 or 308, as the case may be. The pin 326 has a nut 332 threaded thereon which nut bears against the end of the stud 328.

An expansion spring 334 encircles the pin 326 bearing at one end against the slidable block 322 and at its opposite end against the stud 328. These springs exert a tension on the blocks which mount the small feed roll. The small feed roll is therefore yieldingly held toward the large feed roll within the range of its permitted movement. Adjustment of the nuts 332 on the pins 326 determines the limit of movement of the small roll toward the large roll and therefore determines the minimum clearance between the two rolls. The springs permit the small roll to yield outwardly away from the large feed roll to permit fabric strips of varying thickness to pass between the rolls. The burlap web which carries cross wires and has its margins folded over varies in thickness from place to place. Actually this permitted adjustment of the small roll with respect to the large roll is very small because it necessarily has to be within the driving engagement of the teeth of the gears 314 and 318.

The fabric guide roll 110 is disposed above the fabric feed rolls 106 and 108, as shown in Figs. 1 and 2 and also in Figs. 19 and 20, Sheet 11. This guide roll is provided adjacent to its opposite ends with circumferential fabric guide bands 334 shown particularly in Fig. 18, Sheet 9. These bands are adapted to engage the longitudinal margins of the fabric web to serve as guides therefor. These bands 334 are adjustable axially of the roll to suit fabric strips of different width. Fig. 18 shows one band as provided with set screws.

This guide roll 110 is adjustable fore and aft of the machine for the purpose shown in Fig. 22, Sheet 10, and as also illustrated in Fig. 1. This adjustment is for the purpose of being able to set the particular point at which the fabric will be severed by the shears, by varying the length of the run of the fabric between the fabric feed rolls 106 and 108 and the point at which the reinforcing wires 112 are inserted through the fabric.

This guide roll is shown as mounted upon a shaft 336 (Fig. 18, Sheet 9). Fixed to opposite ends of the shaft are pinions 338. These pinions are rotatably supported upon stationary rack bars 340. These rack bars are fixed upon the end frame members 306 and 308, as shown in Fig. 17, Sheet 8, and Fig. 18, Sheet 11. The pinions 338 are supported upon the rack bars 340 for travel fore and aft thereover. The ends of the shaft project beyond the pinions and are journaled within brackets 342. These brackets are secured by stud bolts or the like 344 to the end frame members, as shown in Figs. 19 and 20, Sheet 11. These brackets are slotted as at 346 and the end frame members are provided with a line of spaced apart apertures 348 arranged below the rack bars 340 whereby the brackets have a substantial range of adjustment fore and aft of the machine to vary the position of the guide roll 110, as shown in Fig. 22.

As heretofore set forth, the fabric is fed forward step by step. This step by step advance of the fabric is provided for by mechanism responsive to the rotation of a cam on the main shaft. This cam on the main shaft is so arranged and mounted with respect to other cams on the main shaft which control the functioning of other parts of the machine that the burlap is advanced in proper timed sequence with the performance of other operations. The main shaft cam which actuates the mechanism to advance the burlap is shown in Fig. 2 and indicated as 350. This cam is shown cut away in Fig. 23, Sheet 7, which shows most clearly this step by step advance mechanism.

This cam 350 acts upon a roller 352 to swing a lever 354. The roller is mounted at the upper end of the lever. The lever is pivoted at its lower end at 356 to a bracket mounted on the bed plate 116 of the machine. The lever is coupled by a link 358 with an arm 360 of one way clutch mechanism mounted on the end of the shaft N which shaft carries the large burlap feed roll 106. The only function of the shaft N is to carry this large feed roll.

The clutch mechanism itself is a spring-pressed roller one-way clutch device of a generally conventional character. The outer part 362 of the clutch carries two arms 360 and 364. The arm 364 of the clutch is held by a tension spring 366 through 356, shown in Fig. 23 as connected with the bed plate, to tend to rotate this outer part 362 of the clutch in a counterclockwise direction. The inner part 360 of the clutch is fixed to the shaft N. The outer part 362 is rotatably supported upon the inner part and upon the shaft N as shown in Fig. 25. Clutch rollers 370 held by springs 372 are disposed within cut away openings 374 in the inner part of the clutch. Upon rotation of the outer part 362 (Fig. 23) of the clutch in a clockwise direction by swinging of the lever these rollers grip the inner part of the clutch and the large feed roll 106 is rotated clockwise through an arc to advance the burlap one step. This advance of the burlap occurs once for each revolution of the main shaft M.

To vary the length of the step so as to vary the spacing of the wires through the fabric the lever 354 is provided with adjustment means. There is a stud 376 which stud is rotatably threaded within the lever. One end of the link 358 is adjustably threaded upon this stud so that the link may be adjusted lengthwise over the stud thereby varying the length of the arc of rotation of the feed roll 106.

*Fabric fluting mechanism*

As the fabric is drawn through the machine it passes between the upper and lower bridge members and between cooperating upper and lower fluting shoes carried by such bridge members so that the fabric is fluted, as shown.

The lower bridge member is indicated as 380. It extends between and is supported upon inwardly projecting end portions of the head casting 312, as shown in Fig. 15, Sheet 10; Fig. 21, Sheet 7; and Fig. 25, Sheet 12. This lower bridge member is secured to these head castings by stud bolts 381 or the like, as shown in Fig. 21. The numeral 382, Fig. 15, indicates a reinforcing rib on the bottim of this lower bridge member. The bridge member 380 is provided with upwardly projecting pleating shoes 384 secured thereto in spaced relationship lengthwise of the member. Each shoe is provided with a slot 386 in its forward edge, which slot is adapted to receive the wire 112, as shown in Fig. 25.

The upper bridge member 390 is supported at its opposite ends upon the tops of the head castings 312 and extends across therebetween, as shown in Fig. 17, Sheet 8. It superimposes in spaced relationship the lower bridge member 380. The upper bridge member carries a series of depending upper fluting shoes 392. These shoes are supported by brackets 394 to depend below the bridge 390 (Fig. 25, Sheet 12). These brackets are secured to the bridge by adjustable bolt and nut means 396. These upper fluting shoes 392 are positioned in spaced apart alignment lengthwise along the upper bridge member to be received in the intervals between the lower pleating shoes, as shown particularly in Fig. 15.

Each upper pleating shoe 392 is provided with a hardened wire receiving insert 398 secured within the forward edge of the shoe, as shown in Fig. 25. Such insert block is slotted as at 400 to receive the wire therethrough.

*Wire holding mechanism*

A wire retaining device in the form of an angular lever 402 is pivoted at 404 at one side of each bracket 394 as shown in Figs. 25 and 26. This lever is held by a light spring 406 so that the foot 410 of the lever holds the wire 112 within the groove 400 in the upper pleating shoe. This spring 406 is mounted upon an adjustment screw 408 whereby its tension may be adjusted. Such lever will readily yield against the tension of the spring 406 so as to permit the fabric to be pulled forwardly in its step by step advance.

There is a swingable wire holding plate which extends along in front of the lower fluting shoe supporting bridge 380 and which is adapted to be swung to hold the wire positively in the slots 386 formed in the ends of the lower fluting shoes 384. This swingable plate comprises an intermediate portion 412 and two short end portions 414, Fig. 25. The intermediate portion is pivotally supported by arms 416 which are secured thereto adjacent the opposite ends thereof. These arms are pivoted at 418 to lugs underneath the bridge 380, as shown in Fig. 25. This plate is provided with wire engaging lip portions 420 which serve to hold the wire within the grooves 386 in the lower fluting shoes as shown in Fig. 25.

The intermediate portion of the plate is actuated from the two end portions thereof. These end portions are cam actuated. The operation of these two end portions is shown particularly in Figs. 21, 27, Sheets 7 and 5; and Fig. 25, Sheet 12. Each end portion is swung by cam actuated compound lever mechanism. The cams are carried by the main shaft M. One of these lever devices is shown particularly in Fig. 25. The two lever devices are similar. Each compound lever device comprises an upper lever part 422 which carries the end plate portion 414. This is a relatively short plate portion and is secured to the lever part by screws or the like, as shown in Figs. 25 and 27. This lever part is pivoted at 424 to a block 426 shown in Figs. 27, and 28, Sheet 5. This block is secured by screws or the like to the head casting 312. The short plate portion 414 carried by this upper lever part has a projecting lip portion 415 (Fig. 25) adapted to be received within the wire holding recess formed underneath a plate 417 which plate is secured to the end casting extension 415 of the lower bridge member, as illustrated particularly in Fig. 25.

The lower lever part 428 is pivoted at its upper end as at 430 to the under side of the upper lever part 422, as shown in Figs. 21, and 25. The lower lever part is also yieldingly coupled to the upper lever part by a nut and bolt arrangement 432 with an intervening spring 343 disposed between such lever parts. The tension of this spring may be adjusted, as is apparent. The lower lever part is provided with an arm 436 which carries a cam roller 438. This cam roller seats within a cam groove 440 formed on the inner face of the cam 441. This cam 441 is fixed on the main shaft as shown in Fig. 15. This is the cam member that controls the wire cut off mechanism and the dies over which the wire is bent as more particularly described in our co-pending application.

The construction is such that following the swinging of the wire holding plate downwardly and outwardly so as to permit the burlap to be drawn a step forwardly and following the pulling of the burlap forwardly to a new position the wire holding plate is swung up to a partially closed position at which point the wire is thrust through the burlap. The wire holding plate is then swung to a completely closed position as shown in Figs. 21 and 25. In this position it grips the wire.

During the time the cam roller 438 travels through that portion of the arc of the cam groove 440 which extends for approximately 90° in a clockwise direction in Fig. 21 away from the point indicated by the roller 438, the wire holding plate is held partially closed. It is spaced such a distance away from the bottom of the groove within which the wire is adapted to be seated that the wire can be readily thrust through the machine. During the remaining 180° of arc of the cam groove 440 the wire holding plate is swung to the open position. Through that arc of the cam groove 440 which extends in a counterclockwise direction for approximately 90° in Fig. 21 from the point in which the cam roller 438 is disposed, the wire is held firmly by the wire holding plate. During this time the wire is cut off and the ends are bent over.

The intermediate portion of the wire holding plate 412 is yieldingly connected with the two end portions 414 to swing therewith. Each end portion is cam operated as has been described. Each end portion has a stud or bolt 442 secured to one side of the upper lever part 422 and upon which is mounted one end of a pin 444. This pin extends through a branch 446 of the arm 416 which arm swingably supports the intermediate portion 412 of the wire holding plate. A spring 448 encircles this pin and is held under tension between the branch arm 446 and adjustment nuts 450. Other adjustment nuts 452 are provided on the opposite side of the branch arm 446 whereby the spring tension with which the intermediate portion of the wire holding plate is held against the wire may be adjusted, as desired.

*Fabric severing mechanism*

The web of fabric shown in Fig. 1 is cut up into sections of the length desired for use. The machine is so set up that these sections may be cut to the desired length and fabricated to contain the desired number of cross wires properly spaced apart. The web is severed at those intervals of increased or double width between the successive groups of wires. This cut off mechanism functions automatically during certain selected pauses in the step by step advance of the fabric. The cut off means proper is in the form of a large pair of shears S, Figs. 1 and 22. The construction and operation of these shears is more fully described in our co-pending application above mentioned.

*Timing mechanism*

Generally speaking, the timing mechanism controls the functioning of two solenoid assemblies. One solenoid assembly functions to set in movement means which brings the web cut off shears into operation. The other solenoid assembly controls the functioning of the wire feed mechanism in that at intervals the wire feed is interrupted for longer periods of time than is usual. This is termed a "skip-feed" mechanism.

In the feeding of the wire through the fabric the wire is fed step by step with pauses between the steps and the operation of the entire mechanism is such that at the pause intervals in the advance of the burlap the wire is fed therethrough and at the pause intervals in the feeding of the wire the wire is cut off and bent over and the burlap is advanced. When the required number of wires have been fed through the fabric to provide the number of wires desired for any desired length of strip, the wire feed mechanism is caused to pause or "skip-feed" and the fabric is advanced a step without any wire having been fed therethrough. This provides fabric intervals between the groups of wires of greater width than the fabric intervals that separate the successive wires in the group, all as indicated in Fig. 1.

It is through this extra length intervals of fabric that the shears move to sever the fabric into sections or strips. The timing mechanism controls the functioning of the solenoid assemblies which in turn control the functioning of the wire feed mechanism so as to skip a feed and the functioning of the shears so that the shears cut through this extra length interval of burlap in sequence with the other operations performed by the machine.

The timing mechanism is controlled by the rotation of a cam 626 mounted on the end of the main shaft M furthest to the left, as shown in Fig. 2. This timing mechanism is shown particularly in Figs. 29 and 33, Sheets 12 and 11 respectively; Fig. 30, Sheet 13; Figs. 31 and 32, Sheets 13 and 11 respectively. The cam 626 is mounted on the shaft M adjacent to a hub 628 to which it is fixed to rotate therewith, as shown Fig. 31. The adjacent end of the shaft is journaled in an upright web 630 of the timing mechanism supporting base 632 which base 632 is fixed to the bed plate of the machine, as shown in Figs. 29 and 30. This web 630 supports most of the timing mechanism. The shaft N previously described in connection with the description of the fabric feed mechanism also has a bearing in a bracket 316 which is carried by this web 630, as shown in Fig. 30.

This cam 626 acts upon a roller 634 which roller is mounted upon the upper end of a lever 636. This lever is swingably pivoted at its lower end upon a pivot 638 which pivot is carried by the web 630, as shown in Fig. 30. The lever roller 634 is held against the periphery of the cam by a compression spring actuated plunger device, shown in Figs. 29 and 30. The plunger is indicated as 640 and the spring as 642. The plunger acts against the lower end of the lever, as illustrated in Fig. 30. It is apparent that the lever is swung back and forth upon rotation of the cam once for each revolution of the shaft M.

This lever carries a ratchet dog 644. This dog is pivoted to the lever as at 645, Fig. 29. A spring 646 is mounted on the lever arm and exerts a tension on the dog holding it downwardly against a ratchet wheel 648. For each revolution of the cam 626, the dog 644 rotates the ratchet wheel 648 a definite arc. In the construction shown the ratchet wheel is adapted to be advanced two teeth for each revolution of the cam. On the backward swinging of the lever, the dog is withdrawn to pick up successive teeth of the ratchet wheel.

The ratchet wheel is held at each advanced position against backward rotation by a safety dog 650, Figs. 29 and 30. This safety dog is pivoted to the web 630 as at 651, Fig. 29. This safety dog is disposed below the ratchet wheel and is held upwardly against it by a spring 652. There is a bumper part 654 provided with an adjustment screw 655, shown in Figs. 29 and 30, which bumper is mounted on the web 630 above the ratchet dog 644 to prevent such dog 644 from bouncing upwardly and releasing the ratchet wheel.

This ratchet wheel 648 is fixed on the hub of a driving gear 656 (Fig. 33) to rotate therewith and the driving gear and the ratchet wheel are journaled upon a stub shaft 658 and seat against a shoulder of such shaft. This shaft is fixed in the web 630 of the timing mechnism support, as shown in Fig. 33. This driving gear meshes with and drives an idler gear 660. This idler gear 660 is journaled on a stub shaft 662. This stub shaft is carried by a lever arm 664. This arm is journaled at its lower end upon the stub shaft 658 alongside of the gear 656, all as shown in Fig. 32, Sheet 11. This idler gear is mounted upon an intermediate portion of this lever arm 664.

This lever arm is adapted to be swingably adjusted about its pivotal support on the shaft 658 and the upper end of the arm is adapted to be adjustably secured to the web 630, as shown in Figs. 29 and 30. A stud bolt 666 extends through a slot 668 in the lever arm and into any one of a series of apertures 670 formed in a plate 672, which plate is secured to the web 630. This adjustment of the lever arm is for the purpose of permitting the substitution of different sized driven gears in the train of gears in the timing mechanism to vary the timing sequence.

The idler gear meshes with the drives a driven gear 673, which driven gear is mounted upon another stub shaft 674, Fig. 31, Sheet 13. The opposite end of the stub shaft from that on which the gear is mounted carries toothed timing plates. This driven gear 673 is fixed upon a stub 676 and this stub 676 extends into and is keyed into the adjacent end of the stub shaft 674, as shown in Fig. 31, so that the gear 672 and shaft 674 rotate as one. This shaft 674 extends through and is journaled in a hub part formed in the web 630.

That end of the shaft which projects beyond the opposite side of the web 630 is tapered as at 678. A hub 680 is seated upon this tapered end of the shaft and drawn down tight thereon by a nut and washer arrangement on the threaded end of the shaft, as shown in Fig. 31, to rotate with the shaft. This hub has two toothed timing plates fixed thereon to rotate therewith. These timing plates are spaced apart by an intermediate spacer portion formed on the hub, as shown in Fig. 31. The innermost toothed timing plate indicated as 682 controls the cutting off of the fabric. The outermost toothed timing plate controls the "skip feed" of the wire. Each toothed timing plate is provided with three spaced apart teeth 686. Each toothed plate is also provided with arcuate slots 688. Studs 690 extend through these slots into the hub 680 and secure the toothed plates thereto to rotate therewith. Through the provision of these arcuate slots and threaded studs angular adjustment of the toothed plates upon the hub is permitted to regulate the functioning of the timing mechanism. The further operation of plate 682 is more particularly described in our above mentioned co-pending application, but it may be here stated that plate 682 actuates a limit switch 692 which serves to energize a solenoid and thereby actuate the fabric cutting shears.

The outermost toothed plate 684 acts upon a limit switch 698. This switch is disposed at one side of the toothed plate and is mounted upon the web 630 of the timing mechanism support, as shown in Fig. 20. Such limit switch is provided with a switch lever arm 700 which carried at its outer end a roller 702. This roller 702 is held against the periphery of its toothed plate to be tripped by the teeth thereon as they pass thereover. This limit switch controls the solenoid 238 which controls the skip feed of the wire. The toothed plate 684 trips its limit switch 698 which controls the skip feed of the wire slightly ahead of the tripping of the limit switch 692, which serves to control the shears, by the toothed plate 682. Fig. 29 shows the wire feed limit switch tripped while the teeth which will trip the burlap cut off switch is just coming into engagement therewith.

The arcuate face dimension of the teeth 686 on the toothed plate which controls the skip feed of the wire is such that when a tooth is brought into contact with the switch lever roller to throw the switch it remains in contact therewith for such a period of time as to permit the main shaft to complete one revolution. In other words, one revolution of the main shaft moves the tooth on to the roller of the switch lever, but does not advance it sufficiently to carry it completely across. It requires the succeeding revolution of the main shaft to carry the tooth completely beyond the roller. This is for the purpose of insuring that the burlap comes to a complete stop before the shearing operation is commenced.

What we claim is:

1. Wire feed mechanism comprising opposed pairs of cooperating rotatably supported rolls adapted to grip a wire therebetween to advance the wire upon rotation of the rolls, a swingably supported frame provided with a rockably supported cradle, the rolls of one pair rotatably supported upon said cradle, spring means acting upon the cradle tending to maintain it on an even keel, means coupled with the swingable frame to actuate it to move the cradle supported rolls into and out of wire feeding engagement with the cooperating pair of rolls, power means coupled with the two pairs of rolls through gears to drive both pairs of rolls.

2. Wire feed mechanism adapted to advance a wire in a step by step manner comprising opposed pairs of cooperating rotatably supported rolls adapted to grip a wire therebetween to advance the wire upon rotation of the rolls, a frame swingably supported at one end, a cradle rockably supported upon the frame, one pair of rolls rotatably mounted upon the cradle, a subframe pivoted to the swingable frame, springs intervening the pivotally supported subframe and the swingable frame, power means coupled with the subframe to move the same to swing the swingably supported frame and the cradle to bring the cradle supported rolls into wire feeding engagement with the cooperating pair of rolls.

3. Wire feeding mechanism adapted to advance a wire in a step by step manner comprising opposed pairs of cooperating rotatably supported rolls adapted to grip a wire therebetween to advance the wire upon rotation of the rolls, a frame swingably supported at one end, a cradle rockably supported upon the frame, one pair of rolls mounted upon the cradle, a subframe pivoted to the swingable frame, spring means intervening the pivotally supported subframe and the swingable frame, power means coupled with the subframe to move the same to act through said springs upon the swingable frame to actuate it to move the cradle supported pair of rolls into wire feeding engagement with the cooperating pair of rolls, gears associated with each pair of rolls to drive the same, power means coupled with the gears associated with one pair of rolls to drive the same at all times, said gears being in driving engagement with the gears of the other pair of rolls to drive the same.

4. Wire feed mechanism of the character defined in claim numbered 3, characterized in that means is provided to act upon the cradle to yieldingly maintain it upon an even keel while resistingly permitting tilting thereof.

5. Wire feed mechanism comprising opposed pairs of cooperating rotatably supported rolls adapted to grip a wire therebetween to advance the wire upon rotation of the rolls, a swingably supported frame provided with a rockably supported cradle, the rolls of one pair rotatably mounted upon said cradle, spring means acting upon the cradle tending to maintain it on an even keel, means coupled with the swingable frame to actuate the same to move the cradle supported rolls into and out of wire feeding engagement with the cooperating pair of rolls, power means coupled with the rolls to drive them when in wire feeding engagement, and brake mechanism operable to grip the wire and hold it stationary coupled with the swinging frame to be actuated thereby to grip the wire when the frame moves to break the wire feeding engagement of the rolls.

6. Wire feed mechanism adapted to advance a wire in a step by step manner comprising opposed pairs of cooperating rotatably supported rolls adapted to grip a wire therebetween to advance the wire upon rotation of the rolls, a frame provided with a rockably supported cradle, spring biasing means coupled with the cradle to maintain it on an even keel, the rolls of one pair being rotatably mounted upon the cradle, said frame being swingably supported to be swung to move the cradle supported rolls into and out of wire feeding engagement with the cooperating pair of rolls, power means coupled with the two pairs of rolls through gears associated with each pair adapted to drive the rolls, cam mechanism controlling the swinging movement of the frame, brake mechanism operable to grip to wire and hold it stationary, brake operating mechanism connecting the brake with the swingable frame to actuate the brake to grip the wire upon swingable movement of the frame withdrawing its roll out of wire feeding engagement with the cooperating roll.

7. In a machine for reinforcing a fabric web with transverse wires wherein the web is advanced in a step-by-step movement with a pause following each step, upper and lower fluting shoes between which the web is advanced with the shoes cooperating to flute the web, each of said fluting shoes provided with a wire guide channel with the shoes arranged relative to each other such that the channels are in alignment, wire feeding mechanism operating in timed relationship with the step-by-step movement of the web to feed one end of a wire through said aligned channels and through the web during a pause in the step-by-step movement of the web, and wire holding mechanism mounted on and secured to the machine and movable toward and away from said channels to guide and grip a wire therein fed through the channels, and means coupled with said wire holding mechanism and with the wire feed mechanism to move the wire holding mechanism toward and away from said channels in timed relation with the feed of the wire through the channels during the pauses in the step-by-step advance of the web.

8. The invention as defined in claim numbered 7 characterized in that said wire holding mechanism is pivotally mounted on the machine, and said means includes a cam member rotatably connected to the wire feeding mechanism, and the wire holding mechanism is provided with a cam follower riding against said cam, with the cam and follower being operable to pivot the wire holding mechanism to one position toward the channels to permit and guide movement of a wire fed through the channels, and operable to pivot the wire holding mechanism to a second position gripping the wire within the guide channels, and operable to pivot the wire holding mechanism to a third position spaced laterally from the channels to permit movement of the wire out of the channels upon continued advance of the web.

9. In a machine for reinforcing a fabric web with transverse wires wherein the web is advanced in a step-by-step movement with a pause following each step, upper and lower fluting shoes between which the web is advanced and which shoes cooperate to flute the web, each of said shoes provided with a wire guide channel with the shoes arranged relative to each other such that the channels are in alignment, mechanism operating in timed relationship with the step-by-step advance of the web to feed one end of a wire through said aligned channels and through the web during a pause in the step-by-step advance of the web, wire holding mechanism mounted on and secured to certain of said shoes and yieldingly urged toward the channels therein to releasably grip a wire fed into the channels, other wire holding mechanism mounted on and secured to the remaining shoes and movable toward and away from the channels therein to guide and grip a wire fed through the channels, means coupled with the second mentioned wire holding mechanism and with the wire feeding mechanism to move such wire holding mechanism toward and away from the channels in timed relation with the feeding of a wire through the channels during the pauses in the step-by-step advance of the web.

10. In a machine for reinforcing a fabric web with transverse wires wherein the web is advanced in a step-by-step movement with a pause following each step, stationary upper and lower fluting shoes arranged adjacent to each other in alignment and between which the web is advanced, each shoe provided with a wire receiving channel opening outwardly of the shoe in the direction of travel of the web with the channels in the shoes disposed in alignment, wire feeding mechanism operating in timed relationship with the step-by-step advance of the web to feed one end of a wire through said aligned channels and through the web during a pause in the step-by-step advance of the web, and wire holding means pivotally mounted on and secured to said shoes and spring biased toward the channels in the shoes to releasably guide and grip a wire fed through the channels, and swingable away from the channels under lateral movement and urging of wire in the channels as the web is advanced following the pause during which the wire was fed into the channels.

11. A machine for reinforcing a fabric web with transverse wires as defined in claim 10, characterized in that the wire holding means pivotaly mounted on the shoes comprises wire holding mechanism pivotally mounted on the upper shoes and spring biased to be held to overhang the wire holding channels in the upper shoes and releasably guide a wire web through said channels and wire holding mechanism pivotally mounted upon the lower shoes and spring biased to be held toward the wire receiving channels therein and releasably guide a wire fed through said channels, each of said mechanisms being resistingly swingable away from the channels in its shoes under the lateral movement and urging of the wire in the channels as the web is advanced.

References Cited in the file of this patent

UNITED STATES PATENTS

| Number | Name | Date |
|---|---|---|
| 343,928 | Stambaugh | June 15, 1886 |
| 864,860 | Randall | Sept. 3, 1907 |
| 999,372 | Kempster | Aug. 1, 1911 |
| 1,275,984 | Bailey | Aug. 13, 1918 |
| 1,295,044 | Lay | Feb. 18, 1919 |
| 1,538,883 | Bentley | May 26, 1925 |
| 1,562,997 | Orman | Nov. 24, 1925 |
| 1,600,477 | Knight | Sept. 21, 1926 |
| 1,676,567 | Lowery | July 10, 1928 |
| 1,690,100 | Bull | Nov. 6, 1928 |
| 1,798,531 | Hall | Mar. 31, 1931 |
| 1,972,595 | Libby | Sept. 4, 1934 |
| 2,218,749 | Heilman | Oct. 22, 1940 |
| 2,218,758 | Leal | Oct. 22, 1940 |
| 2,222,220 | Binch | Nov. 19, 1940 |
| 2,578,216 | Young | Dec. 11, 1951 |
| 2,581,776 | Wallace | Jan. 8, 1952 |
| 2,648,842 | Shockey | Aug. 18, 1953 |

UNITED STATES PATENT OFFICE
CERTIFICATION OF CORRECTION

Patent No. 2,800,151                                                July 23, 1957

Newton E. Shockey et al.

It is hereby certified that error appears in the above numbered patent requiring correction and that the said Letters Patent should read as corrected below.

In the grant, lines 2 and 3, for "assignors to V. D. L. Corporation, a corporation of Michigan," read -- assignors, by mesne assignments, to Van Dresser Specialty Corporation, of Van Dyke, Michigan, a corporation of Michigan, --; line 12, for "V. D. L. Corporation, its successors" read -- Van Dresser Specialty Corporation, its successors --; in the heading to the printed specification, lines 5 and 6, for "assignors to V. D. L. Corporation, a corporation of Michigan" read -- assignors, by mesne assignments, to Van Dresser Specialty Corporation, Van Dyke, Mich., a corporation of Michigan --.

Signed and sealed this 15th day of August 1961.

(SEAL)
Attest:

ERNEST W. SWIDER                                   DAVID L. LADD

Attesting Officer                               Commissioner of Patents